United States Patent
Botchek

(10) Patent No.: US 8,713,253 B1
(45) Date of Patent: Apr. 29, 2014

(54) MODULAR STORAGE SYSTEM

(75) Inventor: Robert C. Botchek, Brookfield, WI (US)

(73) Assignee: Guidance-Tableau, LLC, Pasadena, CA (US)

(*) Notice: Subject to any disclaimer, the term of this patent is extended or adjusted under 35 U.S.C. 154(b) by 660 days.

(21) Appl. No.: 11/820,175

(22) Filed: Jun. 18, 2007

(51) Int. Cl.
*G06F 13/00* (2006.01)

(52) U.S. Cl.
USPC .................................. 711/114; 711/E12.084

(58) Field of Classification Search
USPC ............................. 711/114; 710/305; 714/6, 7
See application file for complete search history.

(56) References Cited

U.S. PATENT DOCUMENTS

| | | | | |
|---|---|---|---|---|
| 5,499,337 | A * | 3/1996 | Gordon | 714/6 |
| 6,938,181 | B1 * | 8/2005 | Talagala et al. | 714/7 |
| 2001/0044917 | A1 * | 11/2001 | Lester et al. | 714/718 |
| 2002/0196601 | A1 * | 12/2002 | Lee et al. | 361/685 |
| 2004/0098529 | A1 * | 5/2004 | Sangveraphunski et al. | 710/305 |
| 2004/0133742 | A1 * | 7/2004 | Vasudevan et al. | 711/114 |
| 2004/0143703 | A1 * | 7/2004 | Emberty et al. | 711/115 |
| 2004/0255206 | A1 * | 12/2004 | Sato et al. | 714/54 |
| 2005/0026486 | A1 * | 2/2005 | Thomas | 439/188 |
| 2005/0283655 | A1 * | 12/2005 | Ashmore | 714/7 |
| 2006/0107129 | A1 * | 5/2006 | Franklin et al. | 714/710 |
| 2006/0253766 | A1 * | 11/2006 | Winarski et al. | 714/755 |
| 2006/0253767 | A1 * | 11/2006 | Winarski et al. | 714/755 |
| 2006/0268444 | A1 * | 11/2006 | DeCenzo et al. | 360/69 |
| 2006/0274584 | A1 * | 12/2006 | Flournoy et al. | 365/189.05 |
| 2007/0247804 | A1 * | 10/2007 | Li et al. | 361/687 |
| 2007/0294582 | A1 * | 12/2007 | Rangarajan et al. | 714/36 |
| 2008/0010404 | A1 * | 1/2008 | Sato et al. | 711/114 |
| 2008/0077736 | A1 * | 3/2008 | Mukherjee et al. | 711/114 |
| 2010/0180065 | A1 * | 7/2010 | Cherian et al. | 711/103 |
| 2011/0090633 | A1 * | 4/2011 | Rabinovitz | 361/679.31 |

* cited by examiner

*Primary Examiner* — Sean D Rossiter
(74) *Attorney, Agent, or Firm* — Christie, Parker & Hale, LLP

(57) ABSTRACT

A modular storage system includes a modular storage system module, or "brick," housing a disk drive array containing computer data. Each brick includes a backplane, fan(s) and a skin and has self-describing attributes that allow external control logic to auto-configure for each brick. The brick backplane includes a non-volatile memory device, such as a serial EEPROM, that can maintain and provide static and dynamic information regarding the brick and any disk drives in the disk drive array housed in the brick. The bricks can be attached to one or more base stations implementing and/or incorporating application-specific features and/or functions. Each base station also includes means for supplying power to the bricks and the disk drives contained in the bricks, RAID or other disk drive array control logic. Mounting apparatus ensures that a brick mounted to a base station, is immobilized, thus protecting the brick and electrical connection between the brick and the base station.

20 Claims, 23 Drawing Sheets

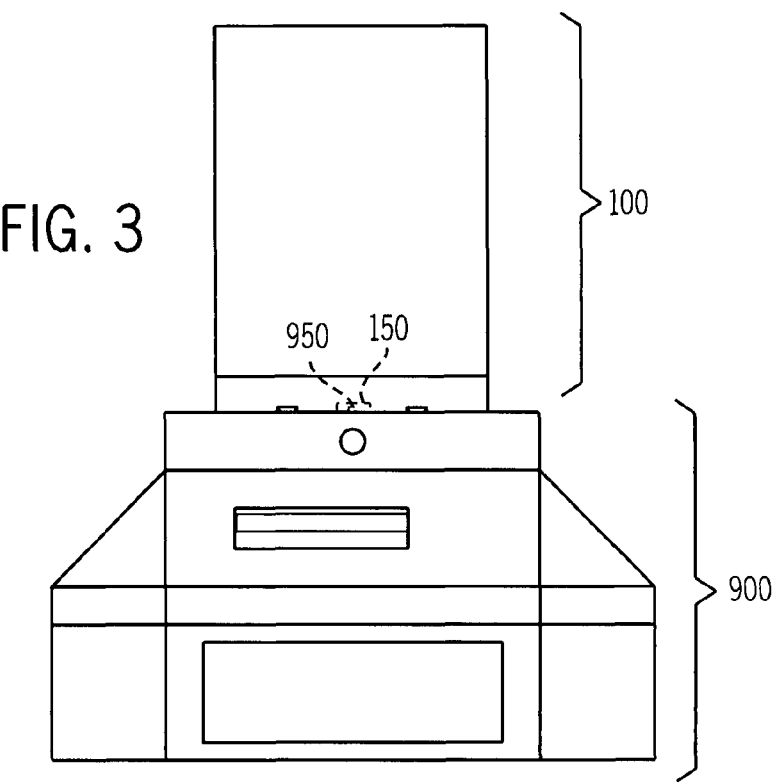
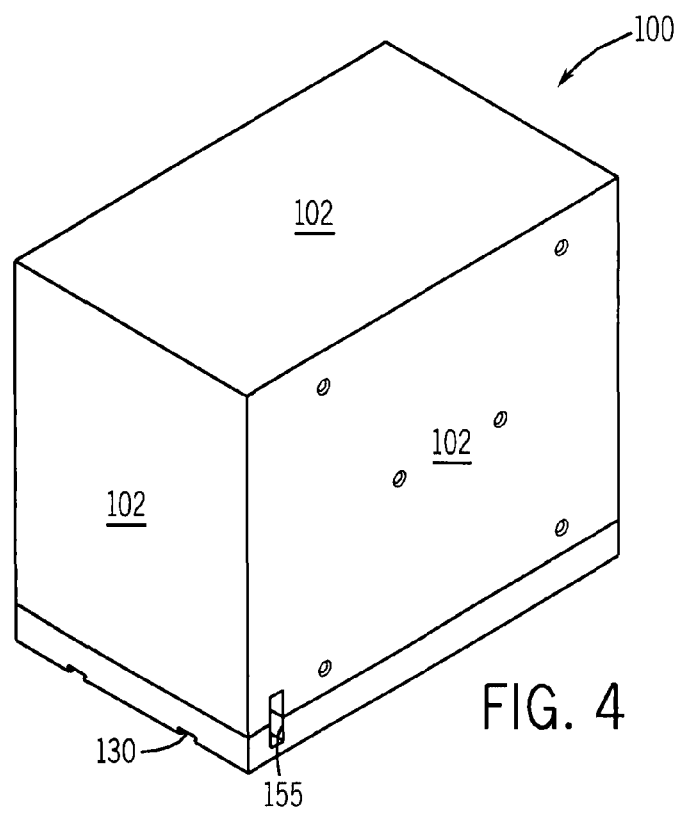

MODULAR STORAGE SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

The present invention relates generally to systems for handling and using computer data and, more particularly, to a modular storage system for disk drives applicable to information storage devices that can manage data over a typical lifecycle, including creation/acquisition, analysis/use and archival storage.

2. Description of Related Art

It is often desirable to acquire, handle, manage, access, archive and otherwise use a number of disk drives containing computer data. Multiple disk drives typically are configured and used in a known RAID system, a number of which are well known to those skilled in the art. For example, a data lifecycle can consist of acquisition of the data, use and/or analysis of the data, and archiving of the data for storage.

Various means have been developed for such uses, such as the storage enclosures made and sold by WiebeTech (for example, the WiebeTech RT-5 unit) and similar companies. These enclosures typically hold 1-5 SATA drives in interchangeable trays with various options of eSATA, FireWire, USB or SCSI interfaces. RAID ("Redundant Array of Independent Disks" or "Redundant Array of Inexpensive Disks") technologies, well known to those skilled in the art, are used to coordinate storage and use functions of multiple storage media. For example, RAID 0 (striping) makes multiple disks look like one large disk. RAID 1 (mirroring) will put all of the new data onto multiple disks so that if one drive goes bad, the disk enclosure will keep working with the another drive. When a replacement drive is inserted, it copies all of the data to the new backup drive.

These earlier disk drive enclosures have included bays for disk drives, a power supply for powering any enclosed drives, RAID control logic, a display for providing information to a user about the disk drives, one or more fans to cool the drives, external connectors and circuitry/hardware for providing information about the disk drives enclosed, etc. For example, an enclosure front panel might provide information about power, temperature measurement and fan speed, and might display such information using one or more LED indicators. Power supplies inside an earlier disk drive enclosure might provide 100-240 VAC auto switched power to the enclosure and any drives housed therein.

A disk drive enclosed in an earlier device typically can be easily accessed and removed using a key-locked door or the like on these earlier systems. Thus disk drives can be swapped in and out of such prior disk drive enclosures without difficulty. Such enclosures typically weigh 12-17 pounds. Disk drive enclosures with 4-5 drive capacity typically cost more than $1,000 (not including the cost of the hard disk drives themselves).

Systems, methods and techniques that provide simpler, inexpensive acquisition, handling, management, analysis and archiving of data in RAID or similar system would represent a significant advancement in the art.

BRIEF SUMMARY

A modular storage system includes a modular storage system module, or "brick," housing a disk drive array containing computer data. Each brick includes a backplane, fan(s) and a skin and has self-describing attributes that allow external control logic to auto-configure for each brick. The brick backplane includes a non-volatile memory device, such as a serial EEPROM, that can maintain and provide static and dynamic information regarding the brick and any disk drives in the disk drive array housed in the brick. The bricks can be attached to one or more base stations implementing and/or incorporating application-specific features and/or functions. Each base station also includes means for supplying power to the bricks and the disk drives contained in the bricks, RAID or other disk drive array control logic. Mounting apparatus ensures that a brick mounted to a base station is immobilized, thus protecting the brick and electrical connection between the brick and the base station.

Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which:

FIG. 3 is a front view of the brick and base station of FIG. 1.

FIG. 4 is an isometric view of the brick of FIG. 1.

DETAILED DESCRIPTION

Figure 1:
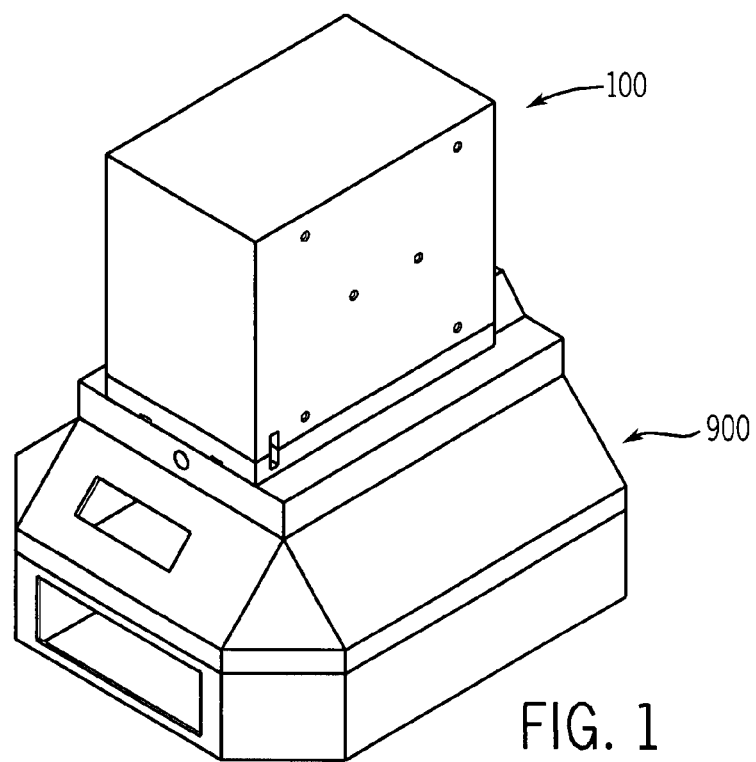
FIG. 1 is an isometric view of an exemplary brick according to one or more embodiments of the present invention mounted to a top-mounting base station, also according to one or more embodiments of the present invention.
Figure 2:
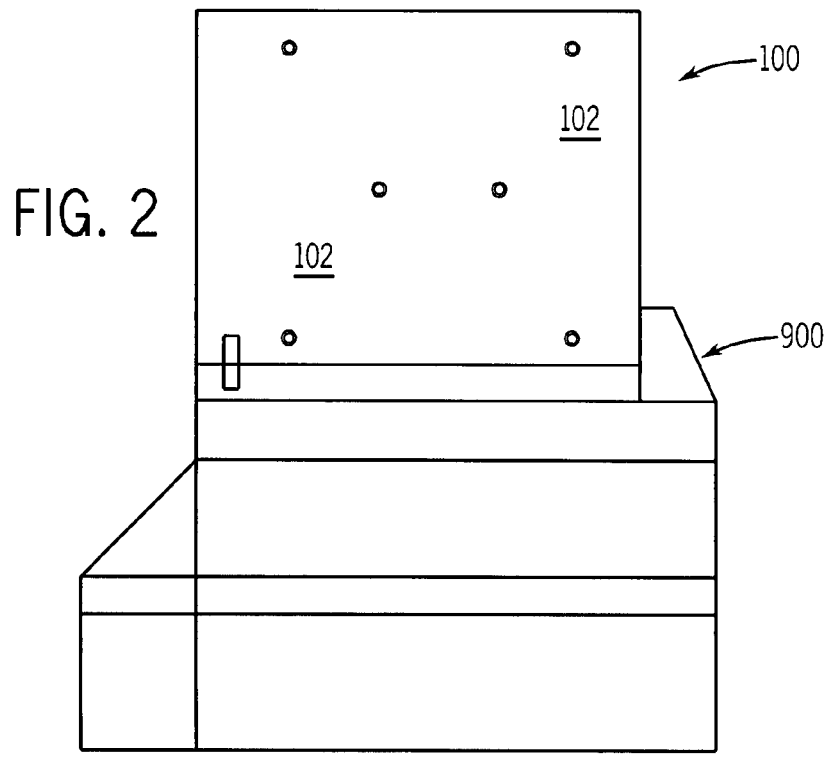
FIG. 2 is a side view of the brick and base station of FIG. 1.
Figure 5:
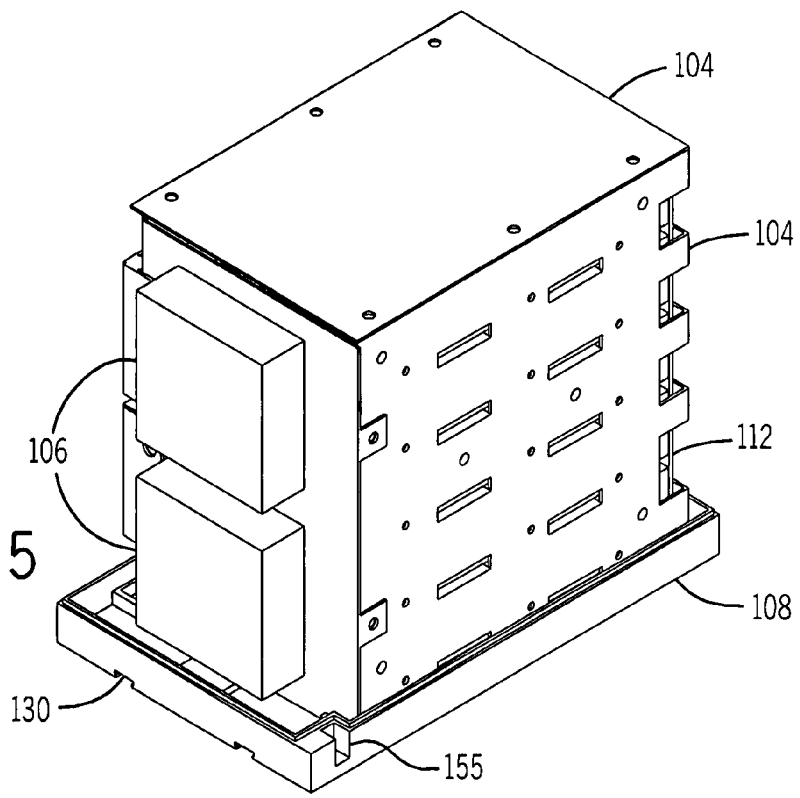
FIG. 5 is an isometric view of portions of the interior of the brick of FIG. 1.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

While computers can be used to create new digital information (for example, with a word processor application), numerous applications use computers instead to capture existing information and store it in a digital format. Such applications often follow a predictable lifecycle that begins with acquisition of the information and storage of the acquired information in a digital format. This data acquisition is then typically followed by analysis or other use of the digital information. Analysis may then be augmented by further, deeper analysis, sometimes termed data mining. Finally, the digital information may be archived or stored (for example, placed off-line for long-term archival).

The field known as computer forensics, a branch of the larger field of criminal or civil forensics, deals with data which follows such a lifecycle and provides a suitable example of the use and implementation of embodiments of the present invention. In the field of computer forensics, forensics practitioners begin by identifying a collection of evidence stored in one or more digital formats, referred to herein as a single data set. A data set is usually stored on one or more information storage devices, such as computer hard disks, FLASH memory cards, digital cameras, multimedia players, etc. The original information storage devices (that is, those devices seized by law enforcement authorities or otherwise made available for acquisition) are termed the subject or evidence devices.

Having identified the subject storage devices related to a data set, the forensics practitioner typically begins by making duplicate copies of the data stored on the subject devices, placing the duplicate copies on a destination set of storage devices, perhaps different in nature from the original, subject storage devices. This process is termed the acquisition of the data set. Often, a digital signature is calculated as data is read from the subject storage devices during acquisition. The digital signature is often a mathematical hash value calculated using an algorithm such as MD-5 or SHA-256. Any digital signatures associated with a data set are then stored with the data set. Using the same digital signature algorithms, digital signatures may be recalculated at later times for copies of the data set. By comparing the recalculated digital signatures with the original digital signatures, the authenticity of data set copies can be verified as needed.

Next, a forensics practitioner (perhaps different from the original practitioner who performed the acquisition) analyzes the data set in one or more ways. Analysis is a potentially complex, time-consuming and iterative process during which the forensics examiner searches the data set for digital information which may be relevant to a criminal, civil or other matter at hand. Often, analysis involves specialized software tools which search and index the data set.

After analysis (or other use of the data set), data sets from two or more matters or cases can be aggregated for purposes of data mining. Data mining is an emerging field which seeks to find correlations in data across multiple data sets. The goal of such data mining is to find patterns across cases which might not be apparent in the examination of a single data set in isolation. For example, in criminal matters data mining might be used to search for patterns across multiple data sets in which the operation of an illegal enterprise is suspected. Or, data mining might be used to search for patterns as part of anti-terrorism activities.

After analysis and optional data mining, computer forensics requires long-term archiving of data sets. No clear standard has yet emerged for the length of time for which a data set must be preserved after the adjudication of a criminal or civil matter. However, given the possibility of appeals many years after the close of a case, current practice suggests that data sets may need to be archived indefinitely.

Each of the four phases in the digital information lifecycle outlined above (that is, acquisition, analysis, data mining, and archiving) imposes unique requirements on the nature of the physical devices used to perform the tasks associated with these phases. Data sets in computer forensics, for example, can tend to be quite large, even for "small" cases; and forensics practitioners are often required to work on many cases and frequently find themselves backlogged in terms of case load.

The acquisition phase generally involves the transfer of the largest quantity of data compared with the other phases in the digital information lifecycle. During the acquisition phase, the subject storage devices are often read and copied sequentially from beginning to end. As such, the acquisition phase demands high sequential data throughput, and forensics practitioners often use specialized computer hardware to perform acquisitions. This hardware is typically capable of reading data from a broad range of subject storage devices, spanning a broad range of information storage standards and protocols. Considering only computer mass storage devices, subject storage devices might use a variety of interfaces, including IDE, SATA, SCSI, USB, FireWire (IEEE 1394), etc., and the specialized hardware used for the acquisition phase must be able to handle as many such interfaces as practical within cost constraints.

However, while the range of interfaces employed in subject devices is large, most forensics practitioners have typically chosen to use only one or two types of destination storage devices for the copies created during acquisition. The destination devices used to hold copies of data sets are often selected to maximize performance while minimizing cost.

Destination devices may also be designed to offer enhanced reliability by employing fault-tolerant schemes such as RAID. Fault-tolerance is especially important in forensics cases in which the original subject devices may not remain available throughout the prosecution of a case.

While acquisition demands high sequential data throughput, the analysis phase often requires high transactional throughput while the forensics practitioner and/or automated forensics analysis software traverse, search and index the data set. And, while acquisition may be performed with specialized hardware, the analysis is most often performed using traditional PC's, albeit ones with high computational performance and memory capacity.

Data mining often requires the attachment or interconnection of large numbers of information storage devices containing numerous discrete data sets. Data mining may also employ multiple computers working in parallel. The large number of information storage devices and computers working in parallel demands that the data sets be stored on devices which are accessible over a networked connection, either traditional computer networks or more specialized storage area networks.

Lastly, long-term archiving demands that data sets be stored on low-cost devices which have good long-term stability.

As can be seen from the foregoing, the requirements of each phase in the information storage lifecycle impose different, and seemingly conflicting demands on the nature of the equipment used to store digital information. Acquisition demands flexibility with regard to the source of the data and very high sequential transfer performance. Analysis requires connectivity with traditional PC systems and high transactional transfer performance. Data mining requires wide-scale networked connectivity. And, where the three former phases demand high performance or broad connectivity, data archiving requires low cost and long-term stability.

The creation of numerous, potentially large data sets also implies a second set of management and logistical problems. That is, users must organize and keep track of numerous data sets spanning many information storage devices. For example, significant time may elapse between successive phases of the digital information lifecycle outlined above. In the case of computer forensics, weeks or even months may elapse between data acquisition and analysis. Moreover, analysis may be shared across multiple forensics practitioners as the data set reveals the need for specialized data analysis skills. Within computer forensics, different agencies or companies may have widely varying practices for tagging or identifying storage devices associated with a given data set. Data mining expands the problem considerably. When considering large storage farms, with data sets from multiple, disparate origins, a mechanism is needed which allows individuals and automated tools to identify the identity and location of a given data set.

Embodiments of the present invention reconcile these differing and seemingly conflicting demands of the information storage lifecycle phases. The present invention also demonstrates how management requirements can be met for a large quantity of information storage devices and data sets.

Embodiments of the present invention relate to techniques, apparatus, methods, etc. that can be used in hard disk data and/or storage management, including in ways consistent with the foregoing discussion of computer forensics and the lifecycle of data in such situations. While embodiments of the present invention have numerous other specific applications, they are particularly well-suited to applications in which data has a particular lifecycle.

Embodiments of the present invention factor out the control and power supply costs and other disadvantages of prior systems for RAID systems to provide less expensive, yet more reliable and more robust data management. Blocks of storage devices (in the form of multiple hard disks), also referred to herein as "bricks," "modular storage systems," "MSS modules," and the like can be used for the cost of the hard disks plus a low-cost "wrapper" typically and essentially comprising a backplane, fan(s) and a skin (for example, plastic and/or metal). Each brick has self-describing attributes that allow control logic (for example, control logic implemented in base stations discussed in more detail below) to auto-configure for each brick. These self-describing attributes also allow for the development of data management applications and schemes that can locate and track bricks and the data contained in each brick. Such storage bricks can be attached to one or more base stations that can each implement and/or incorporate application-specific features and/or functions. By maintaining the disk drives in a semi-permanent brick, the disk array remains unified, permitting use without concern for array makeup and inadvertent changes to the composition of the disk drive arrangement.

Embodiments of the present invention include modular storage system modules, also referred to as "bricks," that provide and/or include:
  metadata regarding the brick itself;
  metadata regarding the disk drives housed in the brick; and
  dynamic operational information
yet factor out:
  high costs associated with earlier systems;
  control logic and other functionalities associated with earlier systems;
  larger dimensions associated with earlier systems; and
  the weight of various components of earlier systems.

Some embodiments utilize such bricks in systems using a number of base stations that provide functionalities usable in one or more phases of the data lifecycle. The resulting data management system provides users with the flexibility to maintain reliable data structures along with a compact, with a portable RAID array that can be transported to and used in the field, that can be coupled to a variety of base stations for various uses.

By way of analogy, the modular storage system of the present invention is similar to commercial tractor-trailers. Trailers incorporate only those components needed to transport cargo safely and are generally much less expensive than the tractors which pull them, so inexpensive that trailers are often used for warehousing cargo. Tractors, by contrast, incorporate expensive engine and drive train components and spend little time idle. Tractors and trailers can be combined and uncombined as needed. Similarly, bricks in the present invention's modular storage system incorporate only those components needed to house hard disk sets safely and are generally much less expensive than the modular system base stations, so inexpensive that bricks can be used for long-term archival/storage of hard disk sets. Base stations, by contrast, incorporate expensive RAID control logic and heavy power supply components. Base stations and bricks can be connected and disconnected as needed.

To extend the analogy, commercial trailers can be transported on other platforms, including trains and ocean going cargo vessels as dictated by cost and destination. Similarly, bricks in the modular storage system can be attached to different base stations capable of performing different, specialized tasks as dictated by task and computational requirements.

Base stations can include a duplicator base station for high-performance duplication, typically at the front end of data's lifecycle. An I/O base station can feature FireWire, USB, eSATA and/or other interfaces as a low cost way to attach bricks to workstations and the like for further data usage, manipulation, etc. A network-connected base station makes a number of bricks available for data culling, data mining, etc. Finally, at the end of the data lifecycle, bricks are inexpensive enough that they can be used to archive data, physically protecting the drives in a RAID set and keeping the RAID set disk drives together.

FIG. 1 shows a brick 100 according to one or more embodiments of the present invention mounted to a generic base station 900, also according to one or more embodiments of the present invention. A brick 100 according to the present invention typically is about half the physical size as compared to earlier disk array enclosures. Unlike earlier disk drive enclosures, brick 100 does not possess doors or other, external means to access, remove, etc. the disk drives contained in brick 100. This "semi-permanent" disk drive containment prevents inadvertent alteration of the disk drive array comprising the RAID set in brick 100 and also helps protect the disk drives in brick 100. As will be discussed in more detail below, brick 100 can be "top mounted" and latched to a base station using an anti-lifting apparatus (for example, a slider mounting system), one or more physical locks between the brick 100 and base station 900, and electrical coupling of the brick 100 and base station 900. Alternatively, brick 100 can be "front mounted" into a bay or other access hole of another base station using one or more similar locks and electrical coupling apparatus. As seen in FIGS. 1-4, brick 100 encloses any disk drives therein with a skin 102, which can be any suitable material such as aluminum, plastic, etc. The disk drives can use SATA, SAS or any other suitable drive interface standard.

FIGS. 5-8 illustrate portions of the interior of an exemplary brick 100. A disk drive support means includes a frame 104 having perforations, the folds of which support one or more disk drives 111 mounted in the brick 100. Other disk drive support means can include clamps, molded members, brackets and other apparatus well known to those skilled in the art. Mounted with fan brackets 110 to the front of frame 104 are one or more fans 106 for cooling mounted disk drives during operation. Frame 104 is mounted to a base 108 that will be explained in more detail below, especially with regard to the mounting apparatus (for example, including anti-lifting and locking apparatus) of the brick 100 during mounting to a base station 900. A backplane 112, described in more detail below, is mounted inside the rear portion of frame 104 and is electrically coupled to each mounted disk drive 111.

Figure 6:
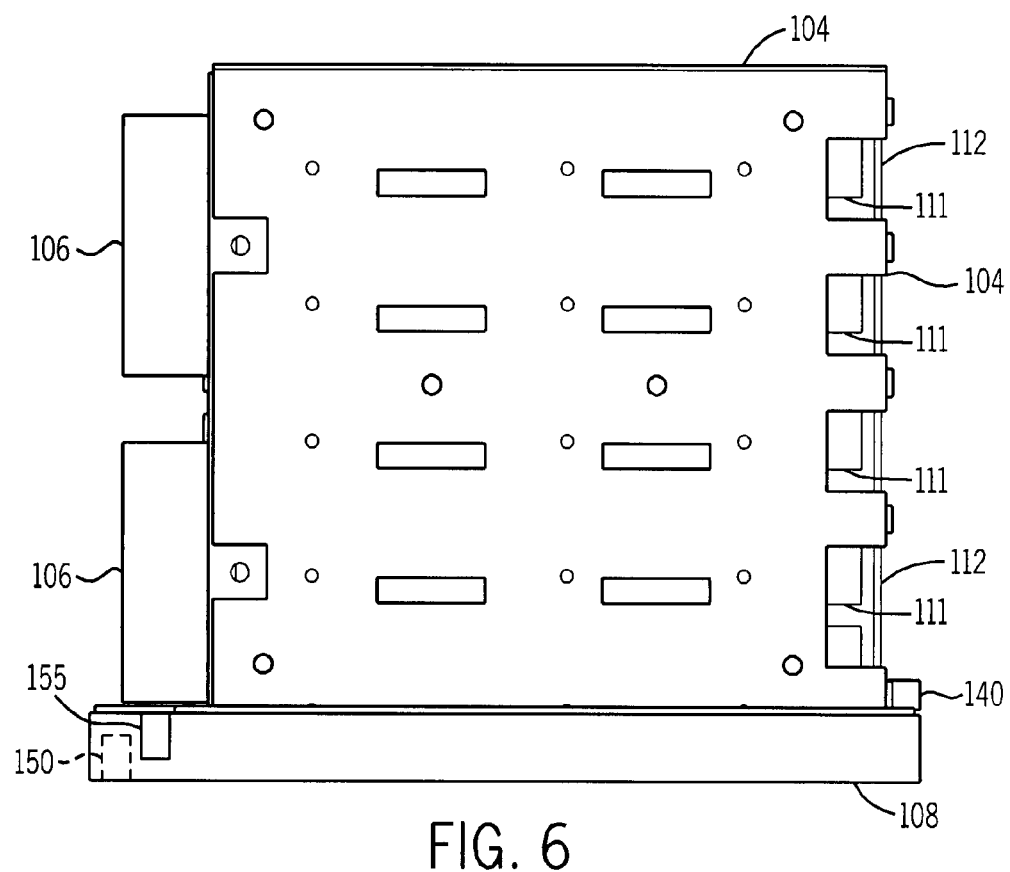
FIG. 6 is a side view of portions of the interior of the brick of FIG. 5.
Figure 7:
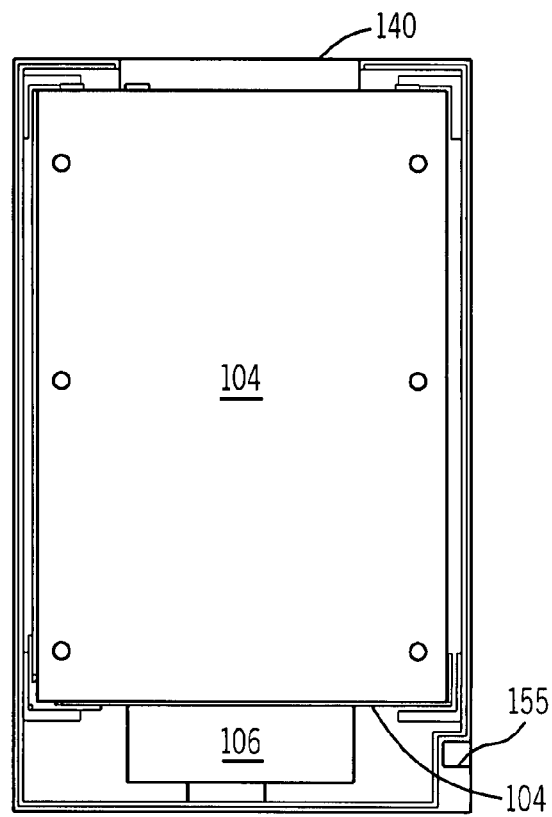
FIG. 7 is a top view of the portions of the interior of the brick of FIG. 5.
Figure 8:
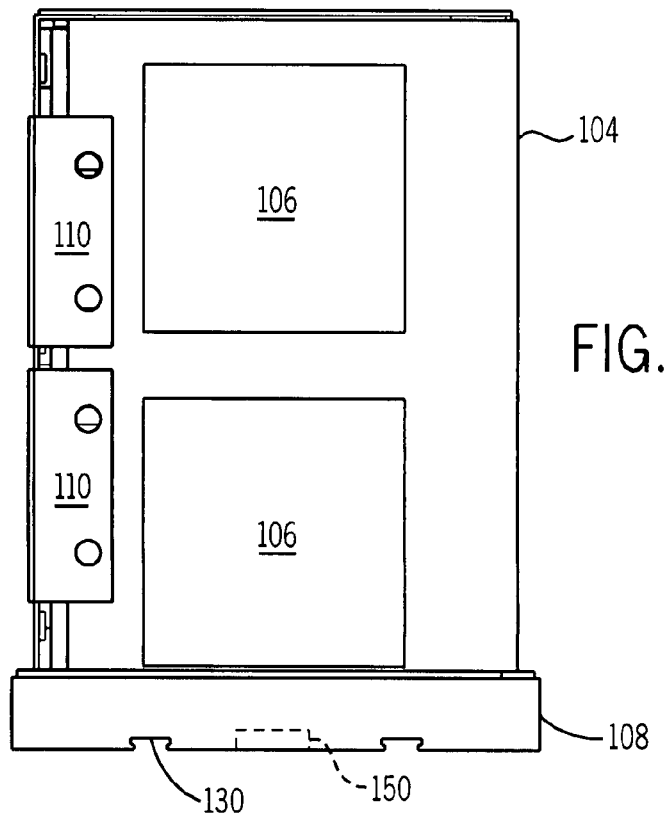
FIG. 8 is a front view of the portions of the interior of the brick of FIG. 5.
Figure 9:
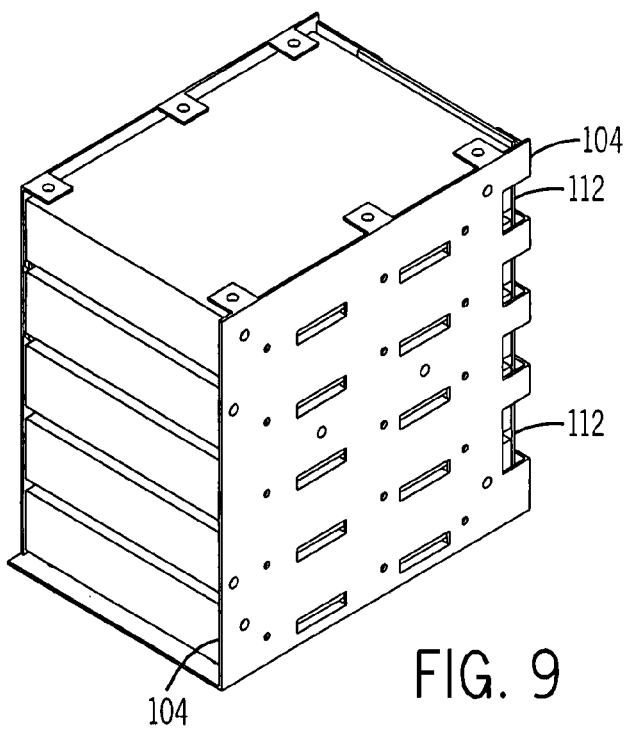
FIG. 9 is an isometric view of further interior portions of the brick of FIG. 1.
Figure 10:
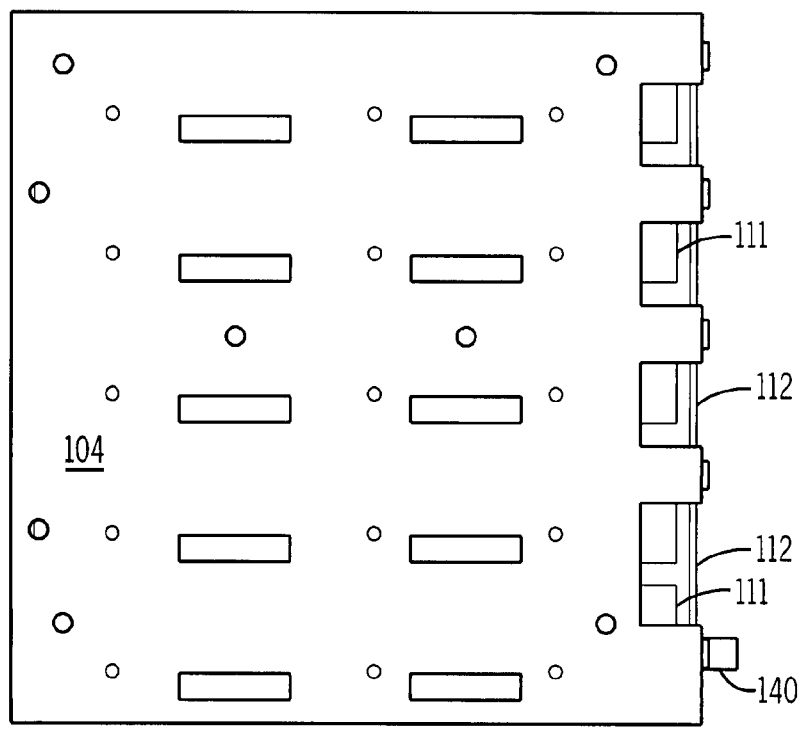
FIG. 10 is a side view of the interior portions of the brick of FIG. 9.
Figure 11:
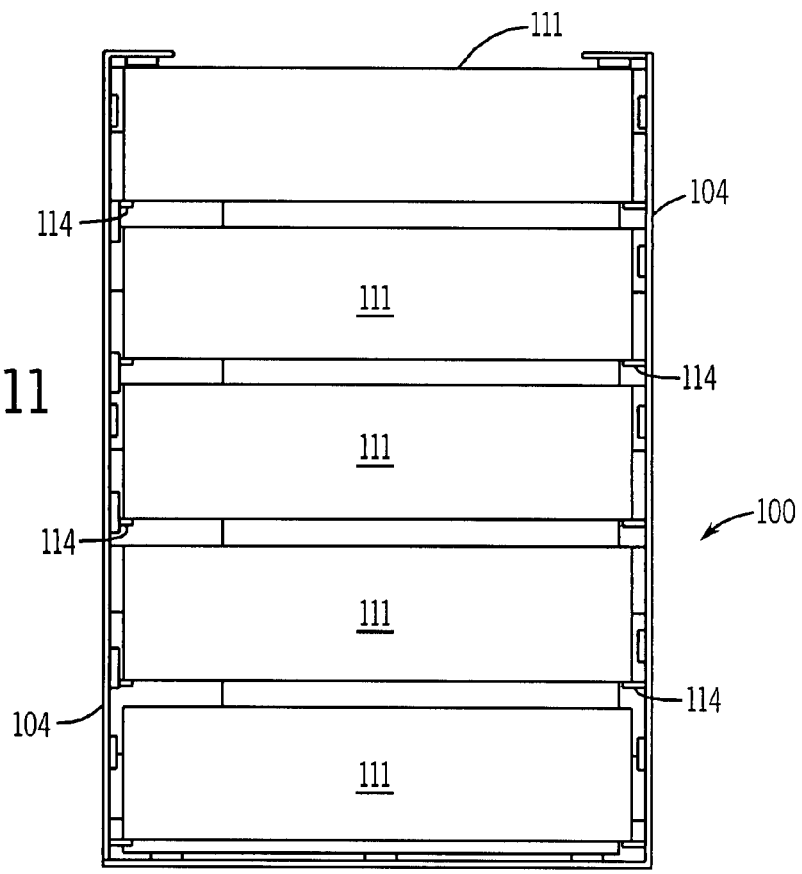
FIG. 11 is front view of the interior portions of the brick of FIG. 9.
Figure 12:
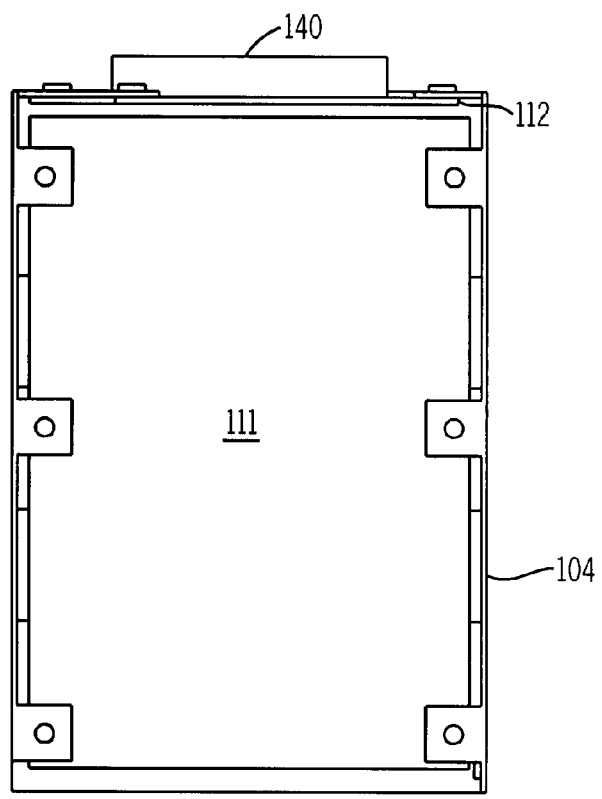
FIG. 12 is a top view of the interior portions of the brick of FIG. 9.
Figure 13:
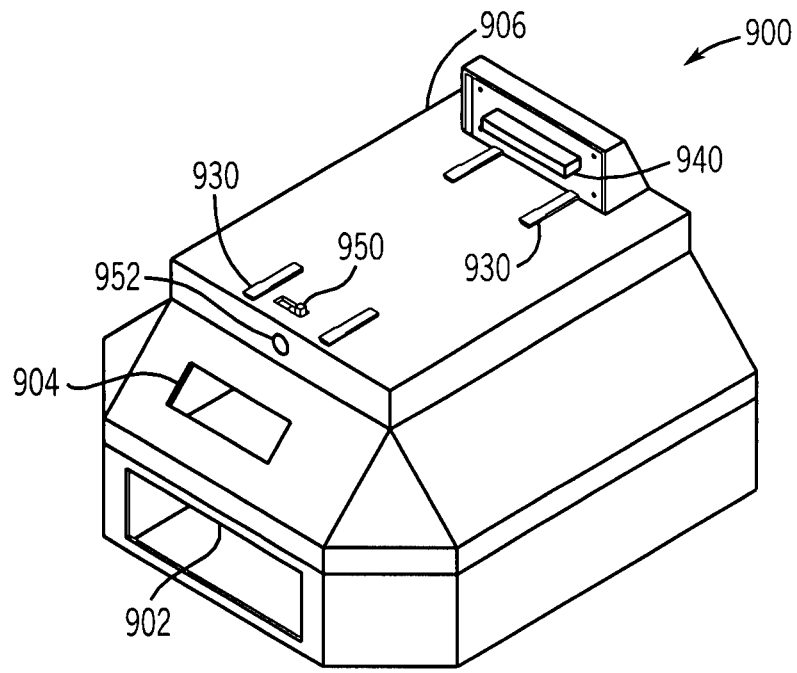
FIG. 13 is an isometric view of a base station according to one or more embodiments of the present invention.
Figure 14:
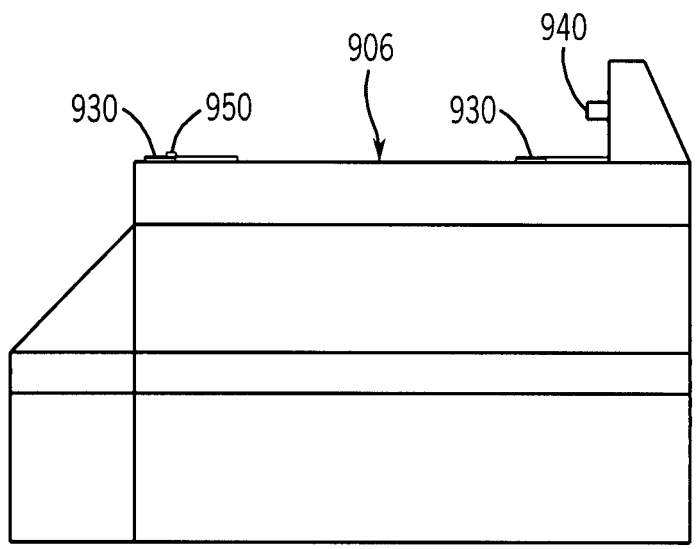
FIG. 14 is a side view of the base station of FIG. 13.
Figure 15:
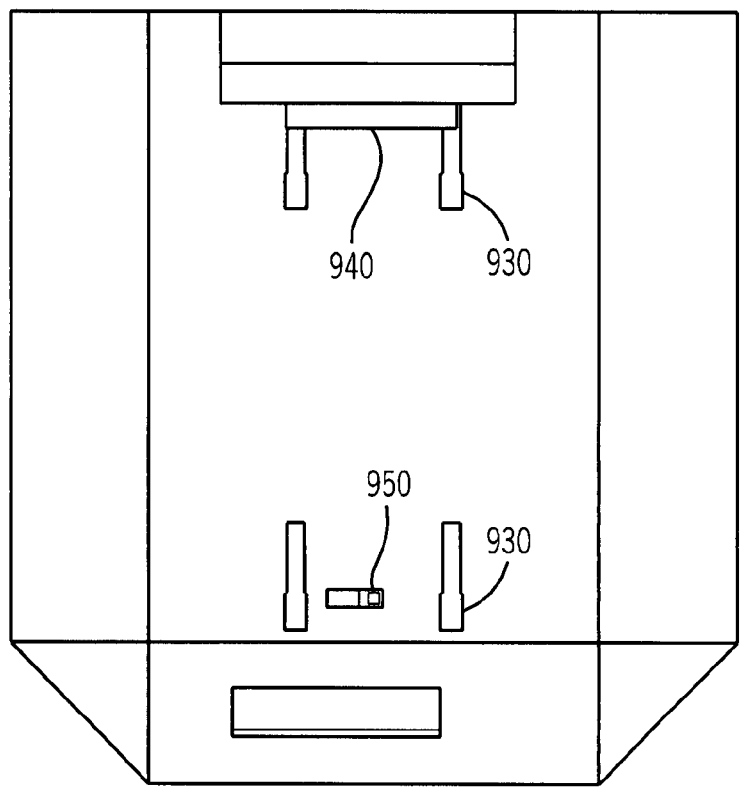
FIG. 15 is a top view of the base station of FIG. 13.
Figure 16:
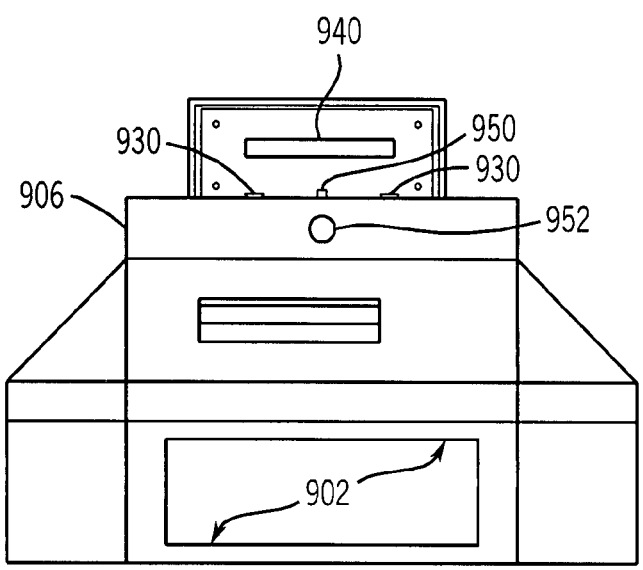
FIG. 16 is front view of the base station of FIG. 13.

In the embodiment of the present invention shown in FIGS. 6, 9 and 10, five disk drives 111 are mounted inside brick 100 and are electrically coupled to the backplane 112, which in turn is coupleable to and powered by a power supply outside the brick 100. Embodiments of the present invention include a non-volatile memory device 115, which typically is part of and/or coupled to the backplane 112. In addition to the non-volatile memory device 115, backplane 112 also can provide I/O buses, power distribution, temperature sensing, fan control, etc.

In the exemplary embodiments of the Figures, the non-volatile memory device 115 is a serial EEPROM (shown, for example, in FIGS. 18A, 19A, 20A, 21A). The non-volatile memory device 115 also can be or include any other suitable reprogrammable, non-volatile memory device that provides appropriate storage capacity (for example, to allow maintenance of metadata and other information about the brick 100 and any disk drives in the RAID set contained in brick 100). Phrases such as "coupled to" and "connected to" and the like are used herein to describe a connection between two devices, elements and/or components and are intended to mean physically and/or electrically coupled either directly together, or indirectly, for example via one or more intervening elements or components or via a wireless connection, where appropriate.

The non-volatile memory device 115 maintains basic metadata about the brick itself and the disk drives housed therein so that such basic information is available to a user. The non-volatile memory device 115 preferably maintains useful static and dynamic information, which are described in more detail below. The dynamic information can be updated whenever the RAID system is updated, changed, etc. For example, drive failures and other pertinent information about each drive and RAID set can be kept as dynamic information maintained by a serial EEPROM. Likewise, static information about the brick's manufacture, capabilities, specifications, etc. also can be maintained, as described in more detail below. Information about the disk drives in the RAID system preferably can be obtained without even having to power up the disk drives themselves.

Using the present invention, management of the RAID set is performed by the RAID control logic in each base station, eliminating the need for and use of such control logic in the disk drive array module, as has been done with earlier disk drive enclosures. Moreover, RAID management is facilitated and automated by information stored in the EEPROM (or other non-volatile memory device) in the brick.

In FIGS. 9-12, the disk drives 111 can be seen mounted/held in frame 104. Each disk drive can be held in a bay or other container, as will be appreciated by those skilled in the art. A number of shelves 114 are formed from perforations of the side of frame 104. Brick 100 thus creates a "semi-permanent" enclosure for the disk drives in the brick's RAID set. That is, unlike prior RAID hard disk drive enclosures that utilize doors or the like that are easily accessed from the exterior of the enclosure, disk drives in a semi-permanent setting like brick 100 cannot be easily removed, swapped, etc. Moreover, disk drives held in a brick 100 according to the present invention are better protected and remain in place in the RAID set created by the disk drives, thus preserving the overall organizational structure of the RAID set. While not easily accessed, the disk drives are nevertheless available for removal, if necessary or desirable (for example, if one of the disk drives fails). Thus the brick 100 is not a "permanent" mounting or enclosure for the disk drives.

Bricks 100 are mounted to base stations 900 for various uses and/or purposes using a combination of electrical communication/coupling and mounting apparatus (which can include locking apparatus and/or anti-lifting apparatus). The electrical communication/coupling provides a user operating a base station with access to the data in the brick's disk drives. Physical immobilization of a brick provides a stable mounting to a base station while protecting the brick itself and the data from damage due to improper or inadvertent removal of a brick from a base station to which the brick is mounted for use.

Exemplary top-mounting base station 900 is shown in more detail in FIGS. 13-16. A bay 902 is provided for application-specific components of the base station's operational capability. Bay 902 can be standardized to a 5.25 inch size to facilitate use with standard devices such as DAT (Digital Audio Tape) drives. As described in more detail below, a top-mounting base station 900 has mounting apparatus that includes anti-lifting apparatus and locking apparatus used in connection with each brick mounted to the base station 900.

Figure 17A:
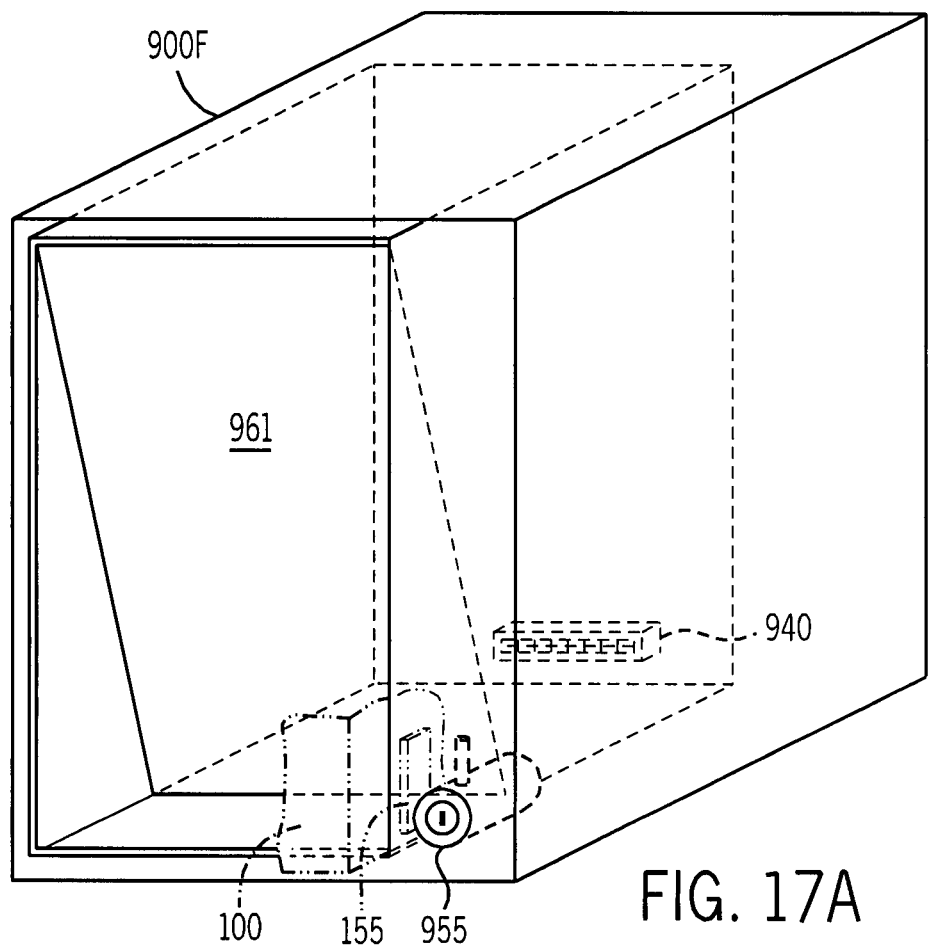
FIG. 17A is an isometric view of a front-loading base station according to one or more embodiments of the present invention.
Figure 17B:
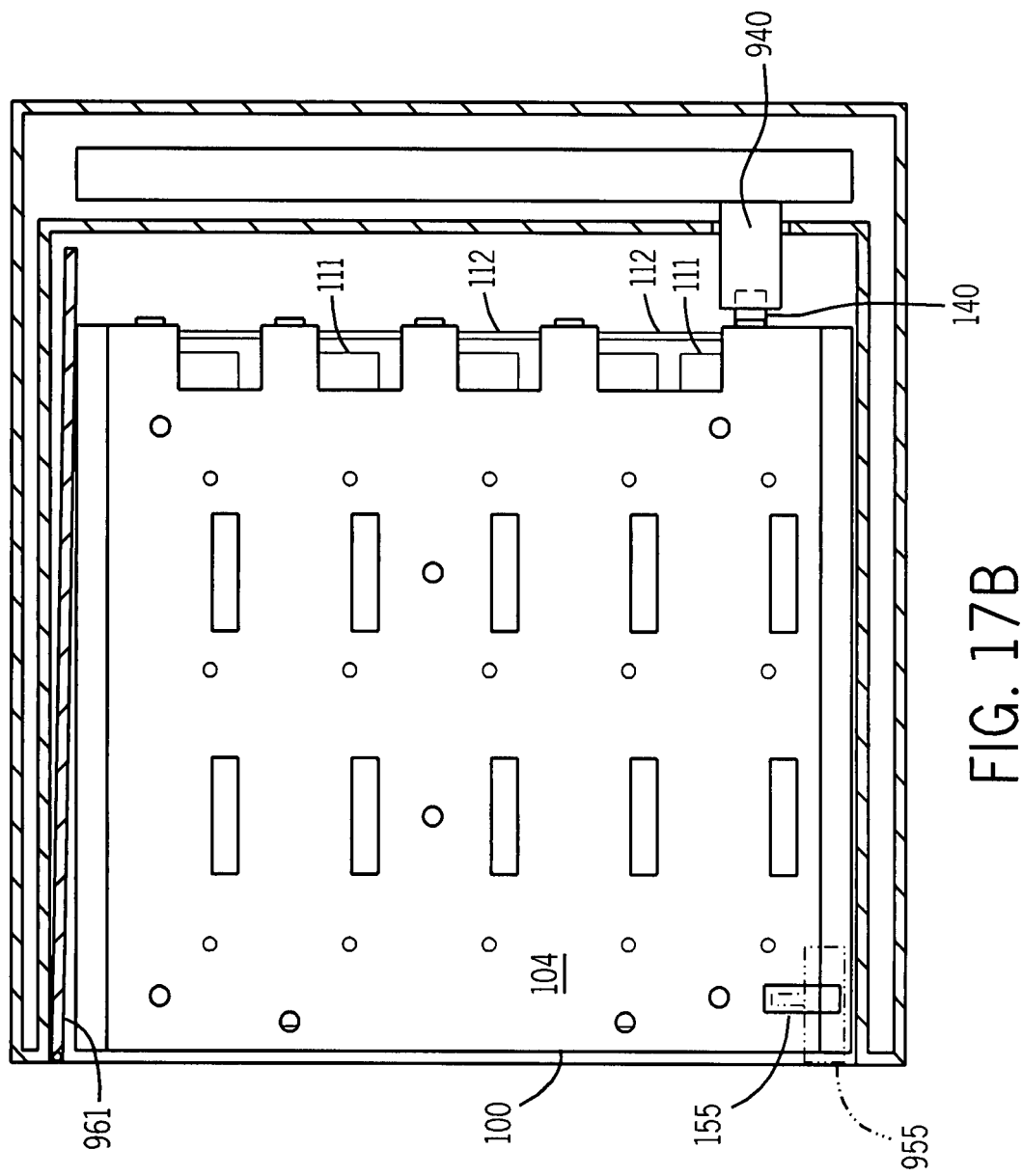
FIG. 17B is a cross-sectional side view showing a brick according to one or more embodiments of the present invention mounted in and electrically coupled to the front-loading base station of FIG. 17A.

An exemplary front-loading base station 900F is shown in FIGS. 17A and 17B. Each brick can include two sets of threaded inserts, one set on the top and one set on the front, that can be used to attach knobs, handles or other members. The top set is used with a top-loading base station. The front set is used with a front-loading base station. Knobs or handles can be detached easily (knobs can be unscrewed and handles can be attached/removed with thumbscrews), so the knobs or handles can be switched by the user on-the-fly to accommodate both top-loading and front-loading base stations.

A hinged door 961 or the like provides access for a brick to be inserted into base station 900F. Door 961 swings up and out of the way when a brick is inserted. An electrical connector 940 functionally identical to those found on top-loading base stations is located at the back of base station 900F, allowing electrical coupling of an inserted brick and base station 900F. Once a brick is inserted into the base station 900F, a lock 955 similar to lock 950 on the top-loading base station is rotated and engages slot 155 in brick 100. Anti-lifting apparatus is unnecessary in the front-loading base station 900F because the brick 100 is completely enclosed on top. A handle or other suitable device can be attached to the front of a brick 100 to allow easy withdrawal of a brick 100 from a front-loading base station 900F. Base station 900F can utilize a backplane or other hardware/circuitry to permit operation of the brick and base station combination, just as with the top-loading version of the base station.

If a base station is going to be used as an I/O conduit between a brick and a workstation or the like, the I/O base station will provide RAID control logic, I/O bridging to any host interfaces, and any other needed functionalities. The host interfaces can include eSATA, USB and/or IEEE 1394 (also referred to by those skilled in the art as "FireWire"). The I/O base station can provide eSATA, USB and/or FireWire connections to permit easy connection of the base station to a computer or other device. Such a combination of brick 100 and an I/O base station 900A is shown the block diagrams of FIG. 18A-18C. Brick 100 contains its disk drives 111, backplane 112, fans 106 and a temperature sensor 107. Backplane 112 includes a module controller 120 for controlling the brick 100. For example, each fan 106 has a speed controller 109 and there is an analog to digital converter 113 for the temperature sensor 107. Controller 120 is coupled to a serial EEPROM 115 that is used to store and provide metadata and the like (for example, static, dynamic and/or other information as described in more detail below). The metadata, data, information, etc. to be stored on the EEPROM is collected and provided to the EEPROM by control logic on one or more of the base stations. Other controls, such as a write protect switch 132 and one or more power switches 134 for drives can also be provided, as will be appreciated by those skilled in the art.

Figure 18A:
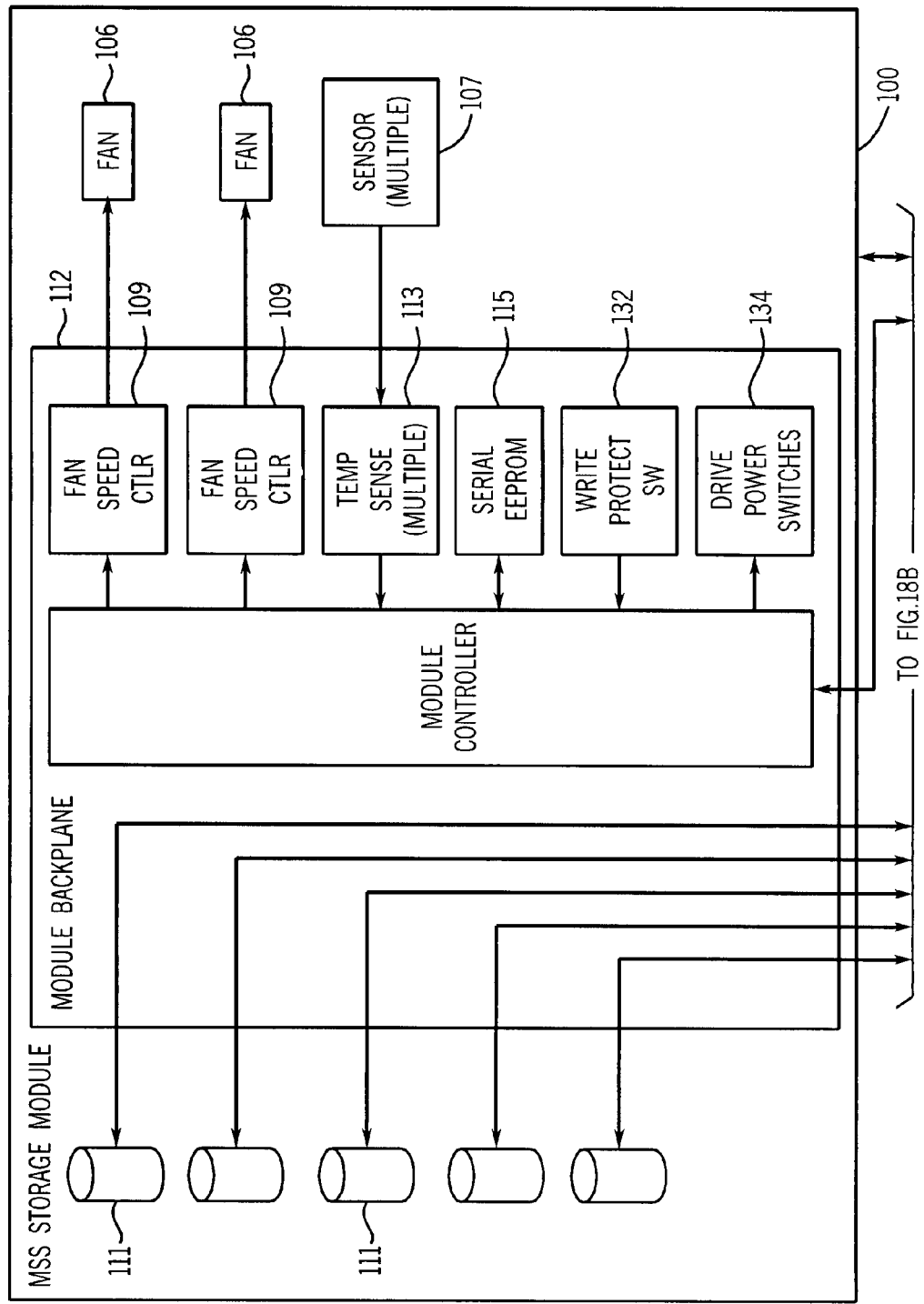
FIGS. 18A-18C together form a block diagram of a combination of a brick and I/O base station according to one or more embodiments of the present invention.
Figure 18B:
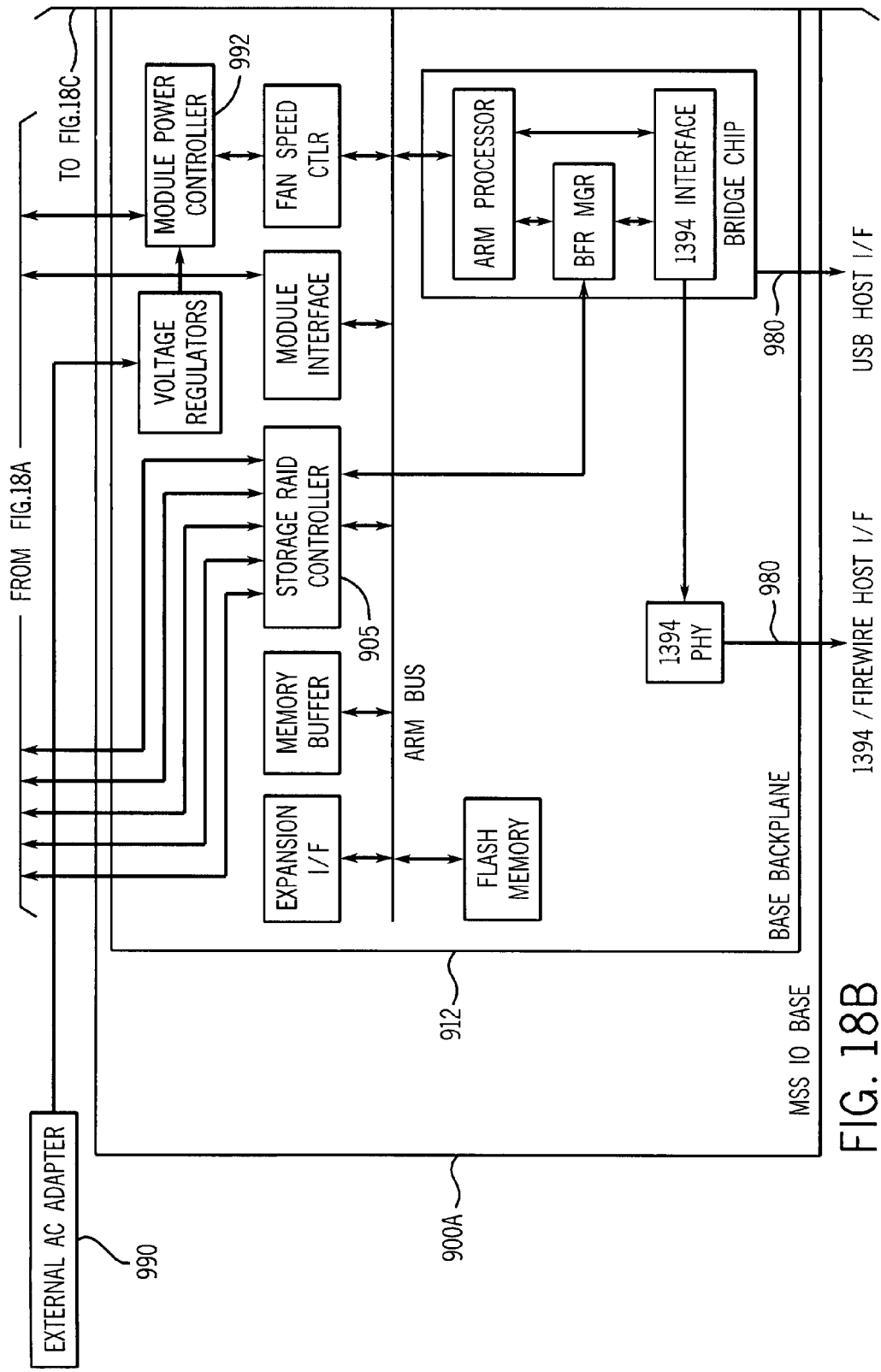
Figure 18C:
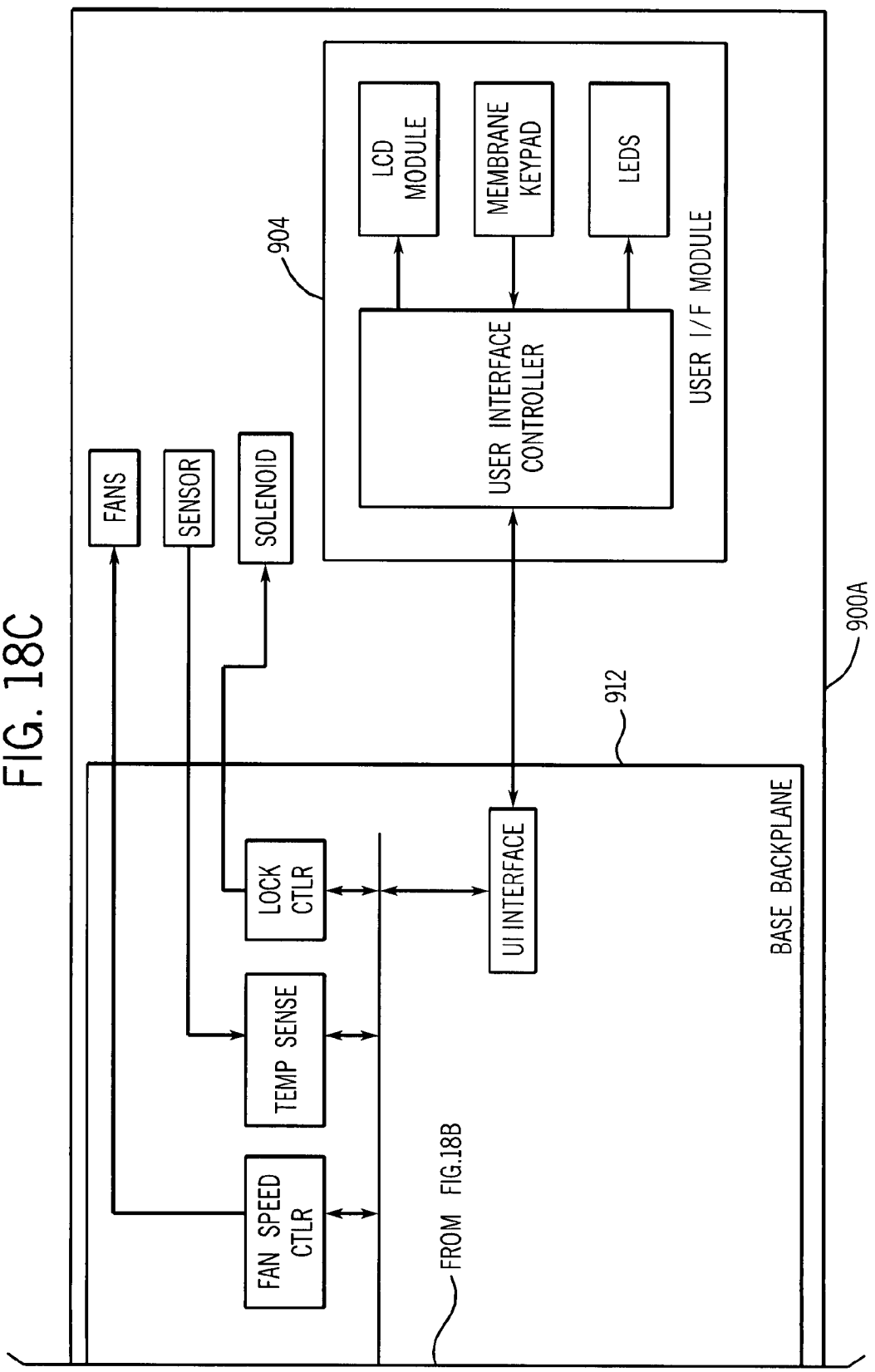

As can be seen from the specifics of exemplary brick 100 and exemplary base station 900A of FIGS. 18A-18C, power is supplied by the base station 900A to brick 100 from a suitable source (for example, an external AC adapter 990) via voltage regulators and a power controller 992, in contrast to the incorporation of such power supplies in earlier hard disk drive enclosures. As a result, the cost, bulk and weight of the power supply has been factored out of the disk drive array, further reducing cost and weight and improving portability and affordability of the brick.

In base station 900A a base station backplane 912 is coupled to the brick backplane 112 in any suitable manner. One or more host interfaces 980 can connect a host device to base station backplane 912. Moreover, a user interface module 904 can be implemented in the base station 900A. In addition, control circuitry for the RAID set and its operation is handled by a RAID set controller 905 in the backplane 912 of base station 900A. Again, this type of RAID control typically has been part of earlier disk drive enclosures, but has been removed from the brick configuration of the present invention.

Figure 19A:
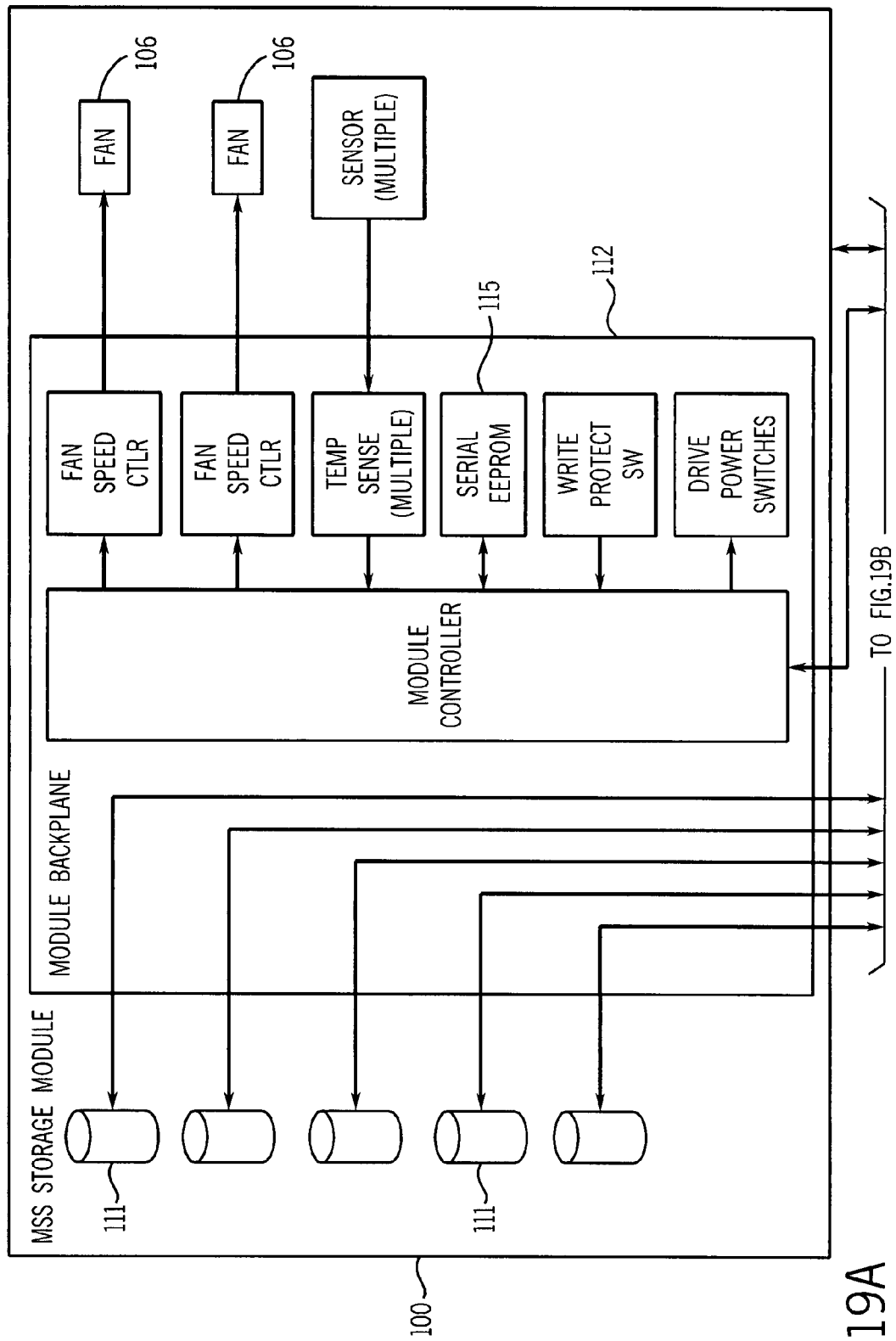
FIGS. 19A-19C together form a block diagram of a combination of a brick and duplicator base station according to one or more embodiments of the present invention.
Figure 19B:
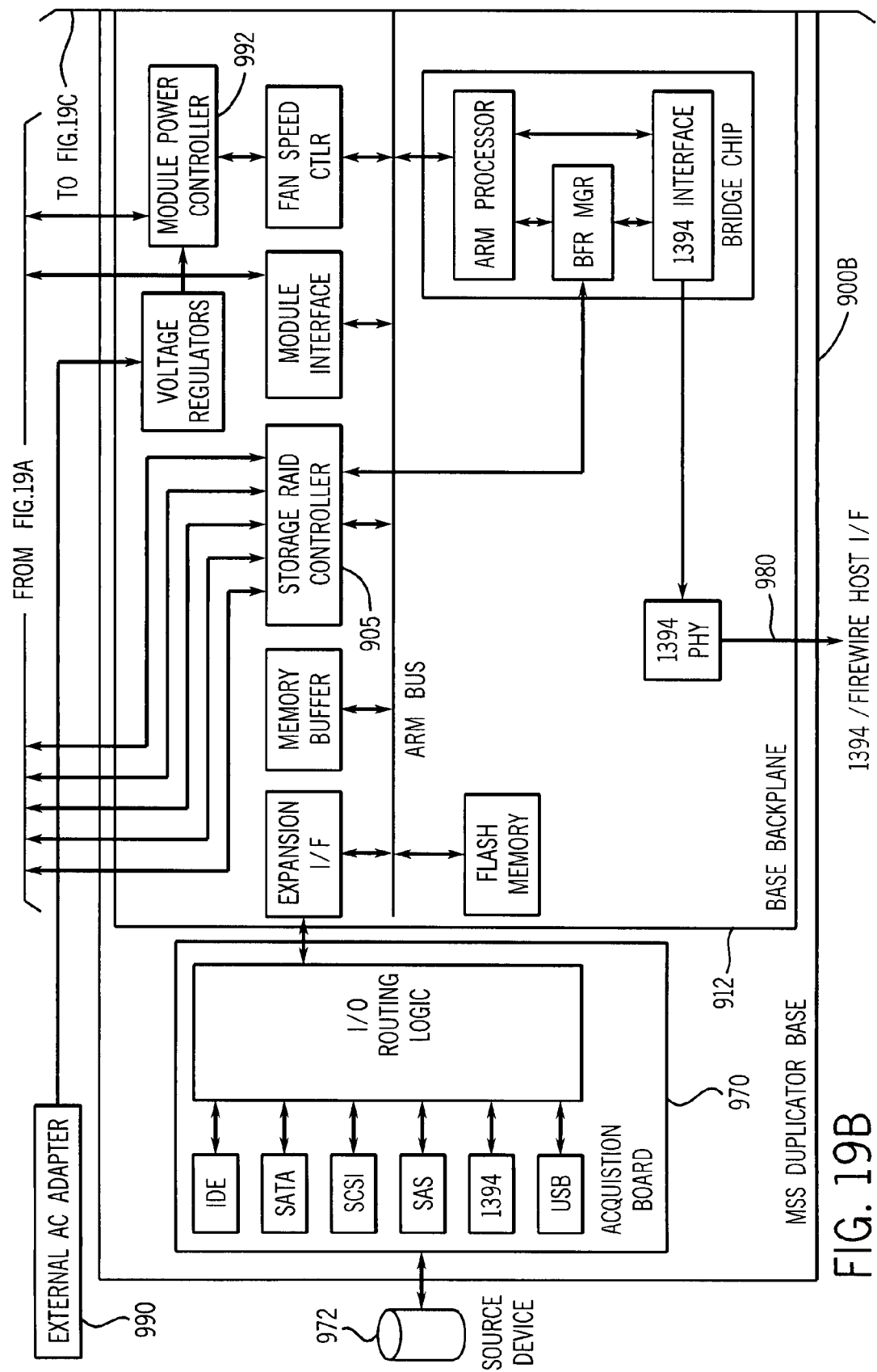
Figure 19C:
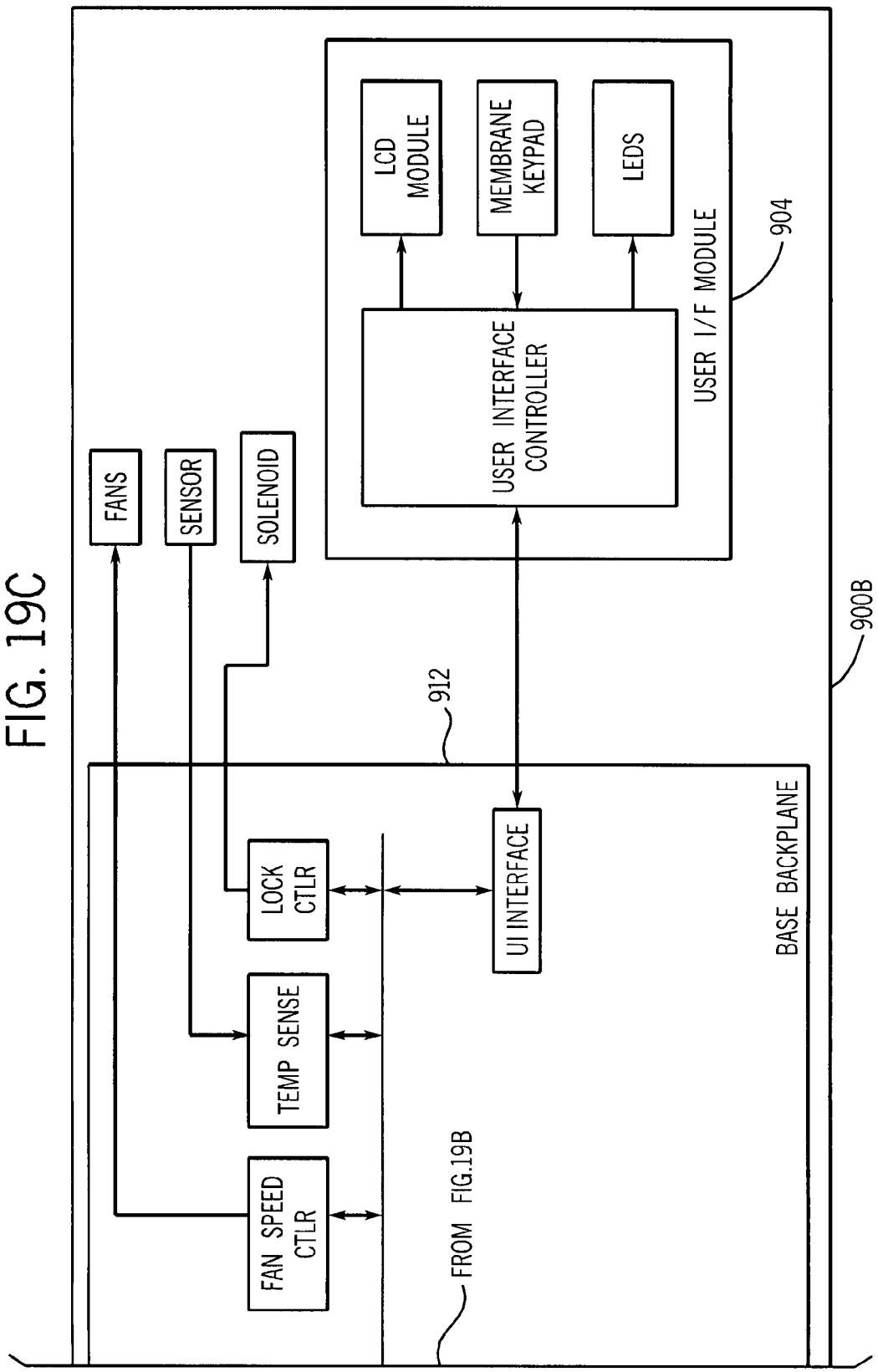

In a base station configured to function as a duplicator, an input module for data from an external data device is provided (for example, using IDE, SATA, SCSI, etc. ports). This allows duplication of a drive or other data device on a lab bench or the like to generate a copy of that data on the RAID system of the brick. FIGS. 19A-19C illustrate an embodiment of such a duplicator base station 900B coupled to brick 100. The base station 900B uses a backplane 912, power source 990, RAID control 905, user interface module 904 and host interface 980 similar or identical to those in the I/O base station 900A of FIG. 16. In base station 900B of FIGS. 19A-19C, however, an acquisition board 970 provides circuitry and I/O routing logic (well known to those skilled in the art) to permit copying of data from a source device 972 to the RAID system of brick 100.

Figure 20A:
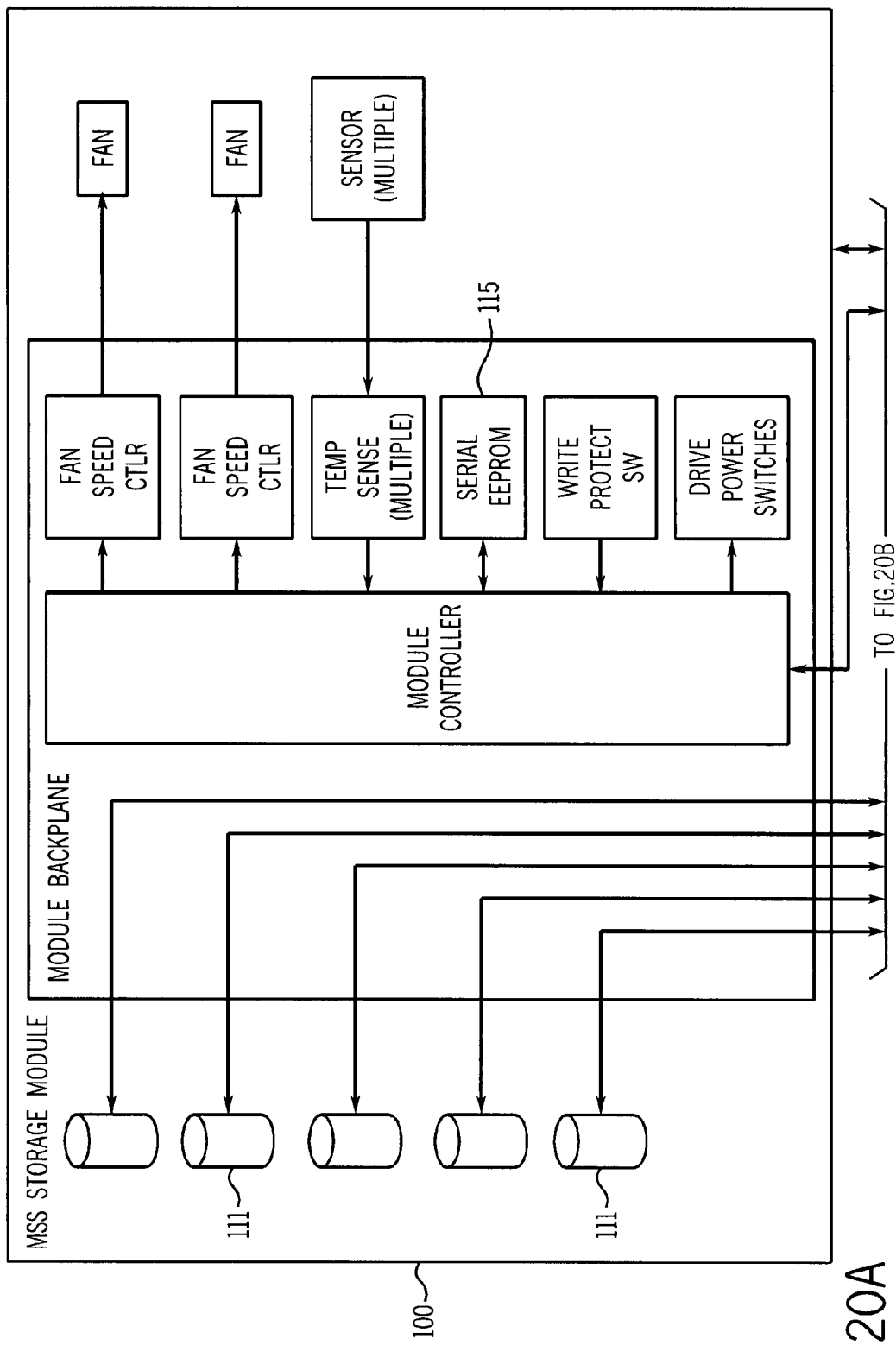
FIGS. 20A-20C together form a block diagram of a combination of a brick and archiver base station according to one or more embodiments of the present invention.
Figure 20B:
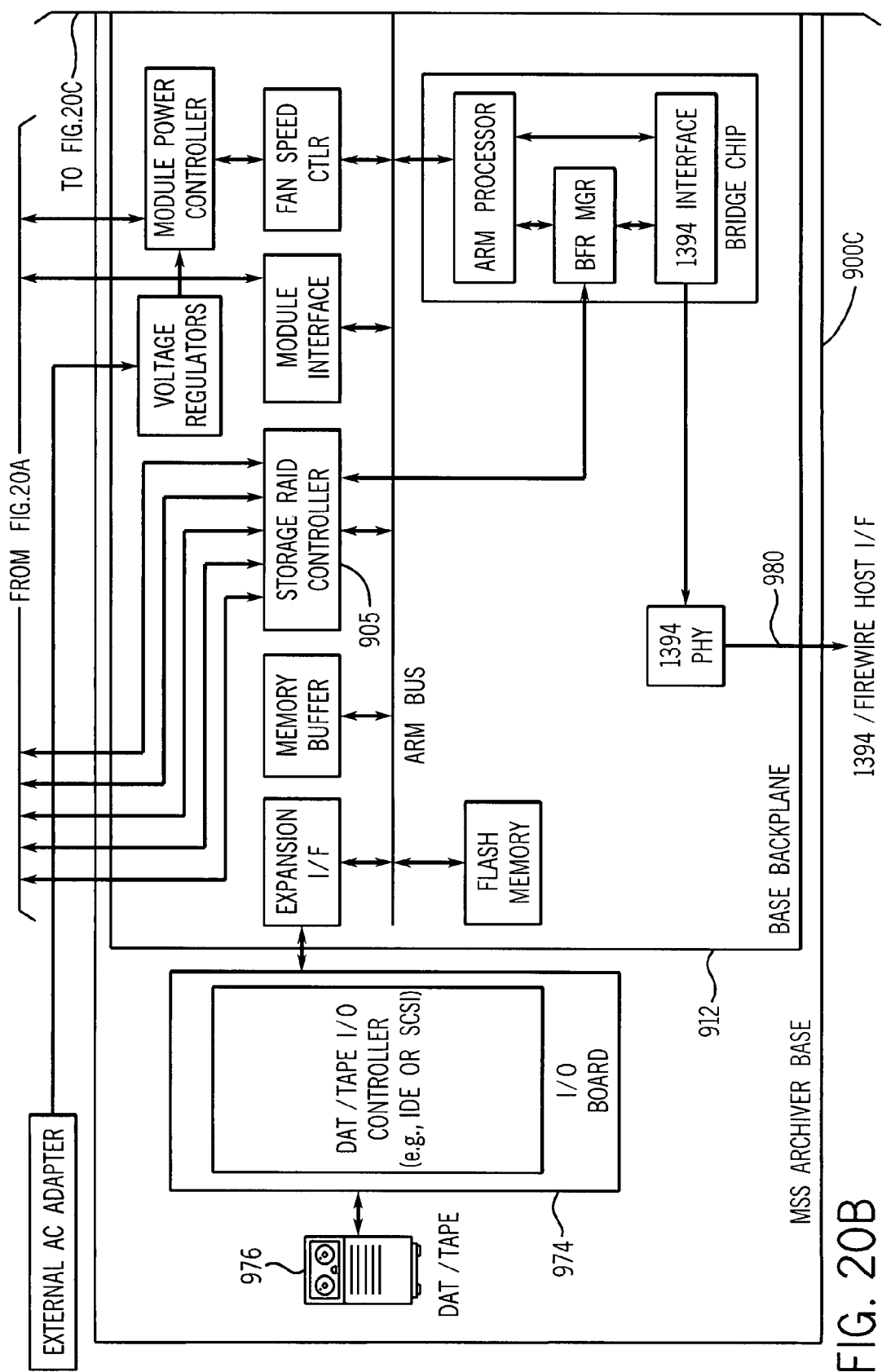
Figure 20C:
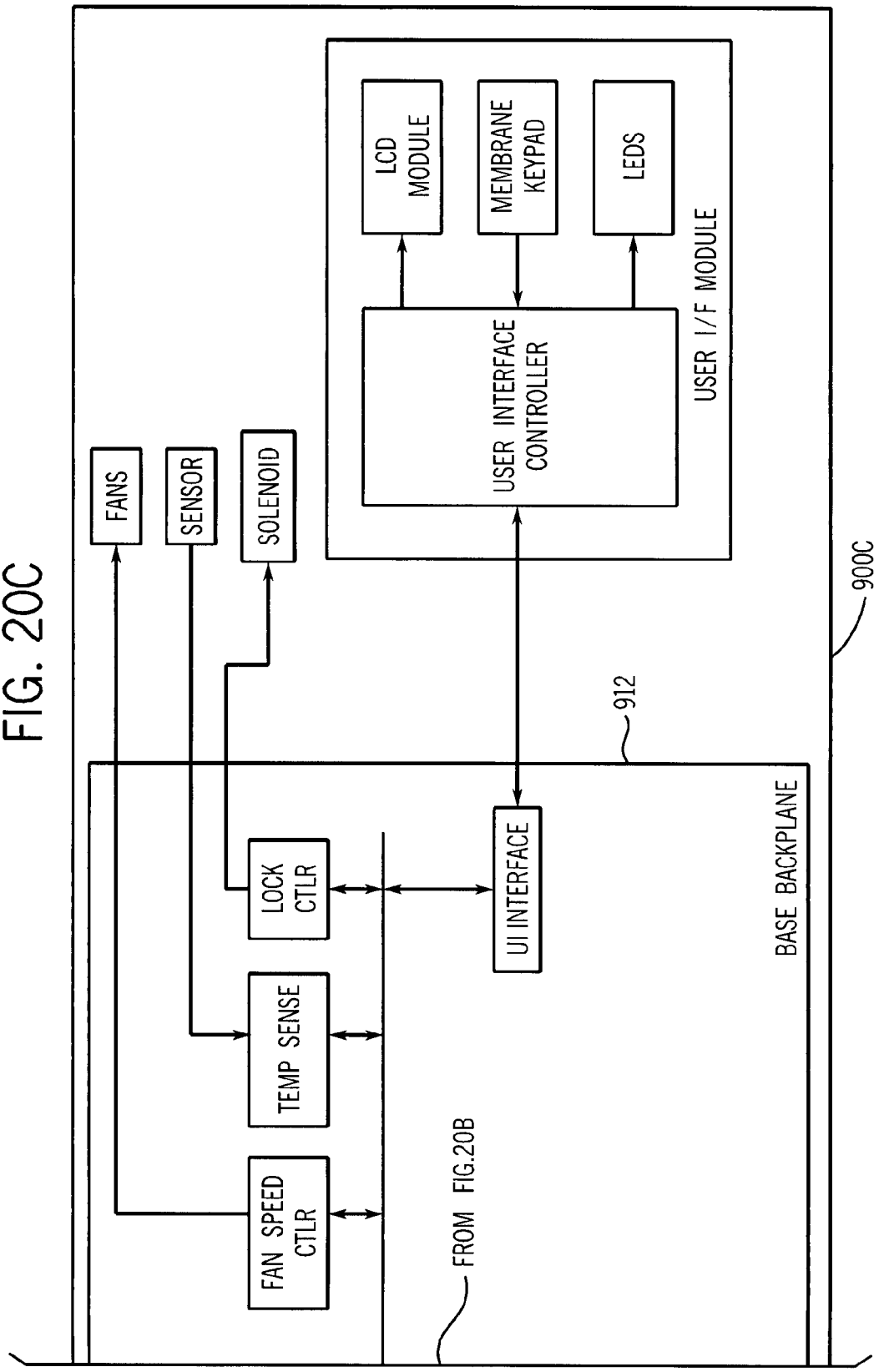

In an archival-related base station, a digital audio tape ("DAT") drive can be provided. An example is shown in FIGS. 20A-20C, which again use brick 100, as well as an archiver base station 900C that again includes a backplane 912, power source 990, RAID control 905, user interface module 904 and host interface 980 similar or identical to those in the I/O base station 900A of FIGS. 18A-18C. In base station 900C of FIGS. 20A-20C, an I/O board 974 (for example, implementing a DAT/tape I/O controller) couples a DAT/tape device 976 to brick 100 via base station 900C.

Figure 21A:
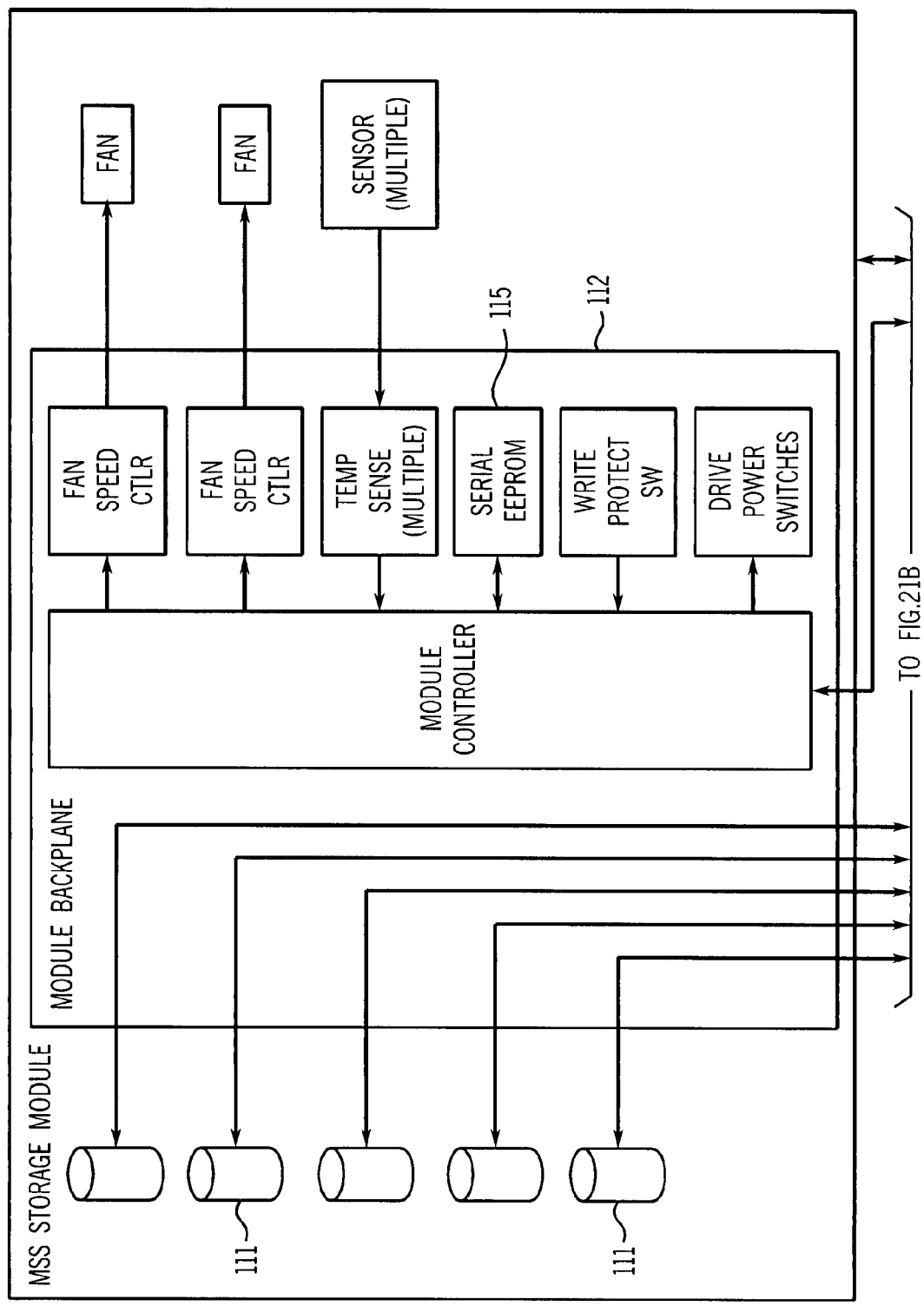
FIGS. 21A-21C together form a block diagram of a combination of a brick and network base station according to one or more embodiments of the present invention.
Figure 21B:
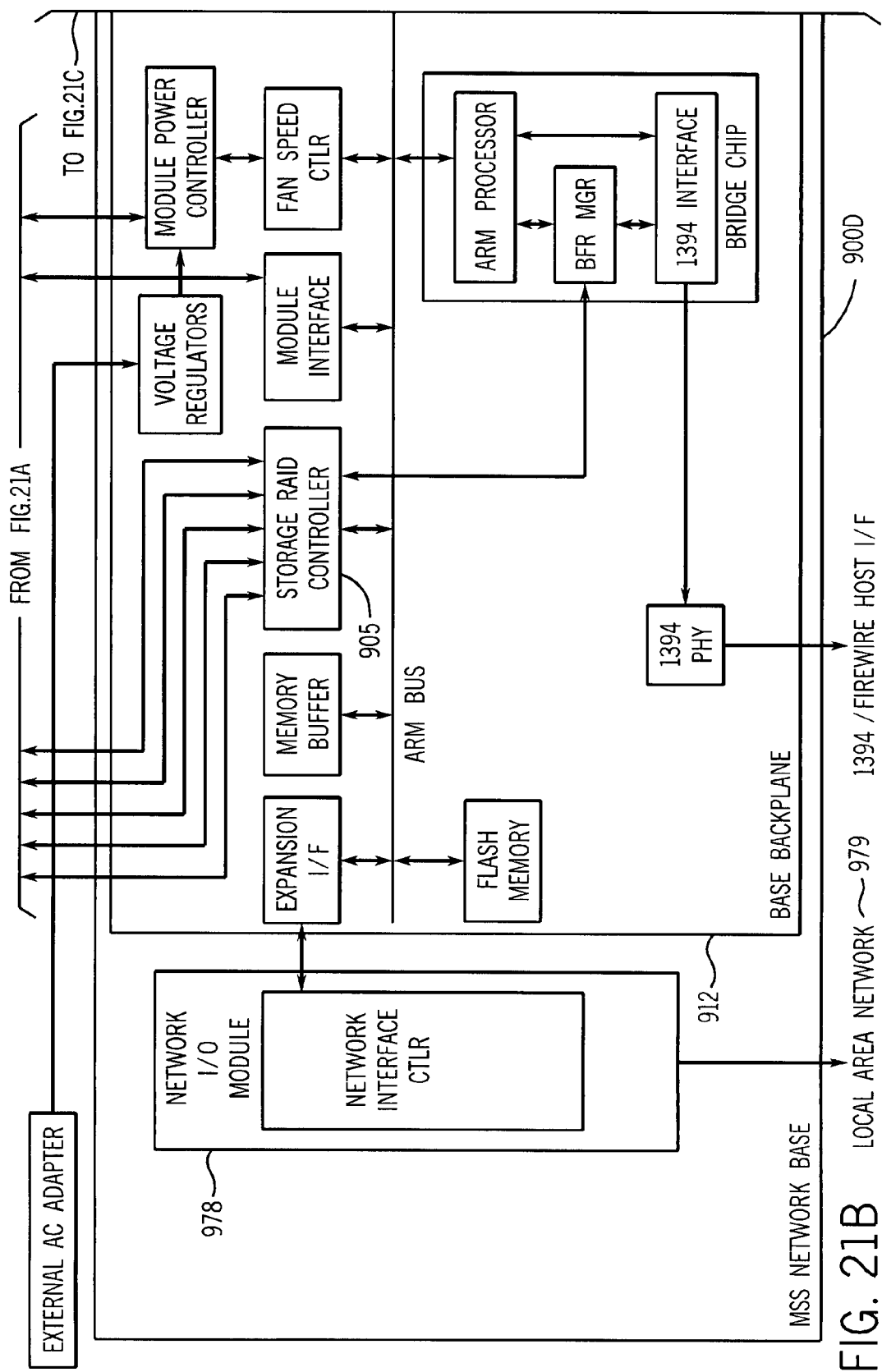
Figure 21C:
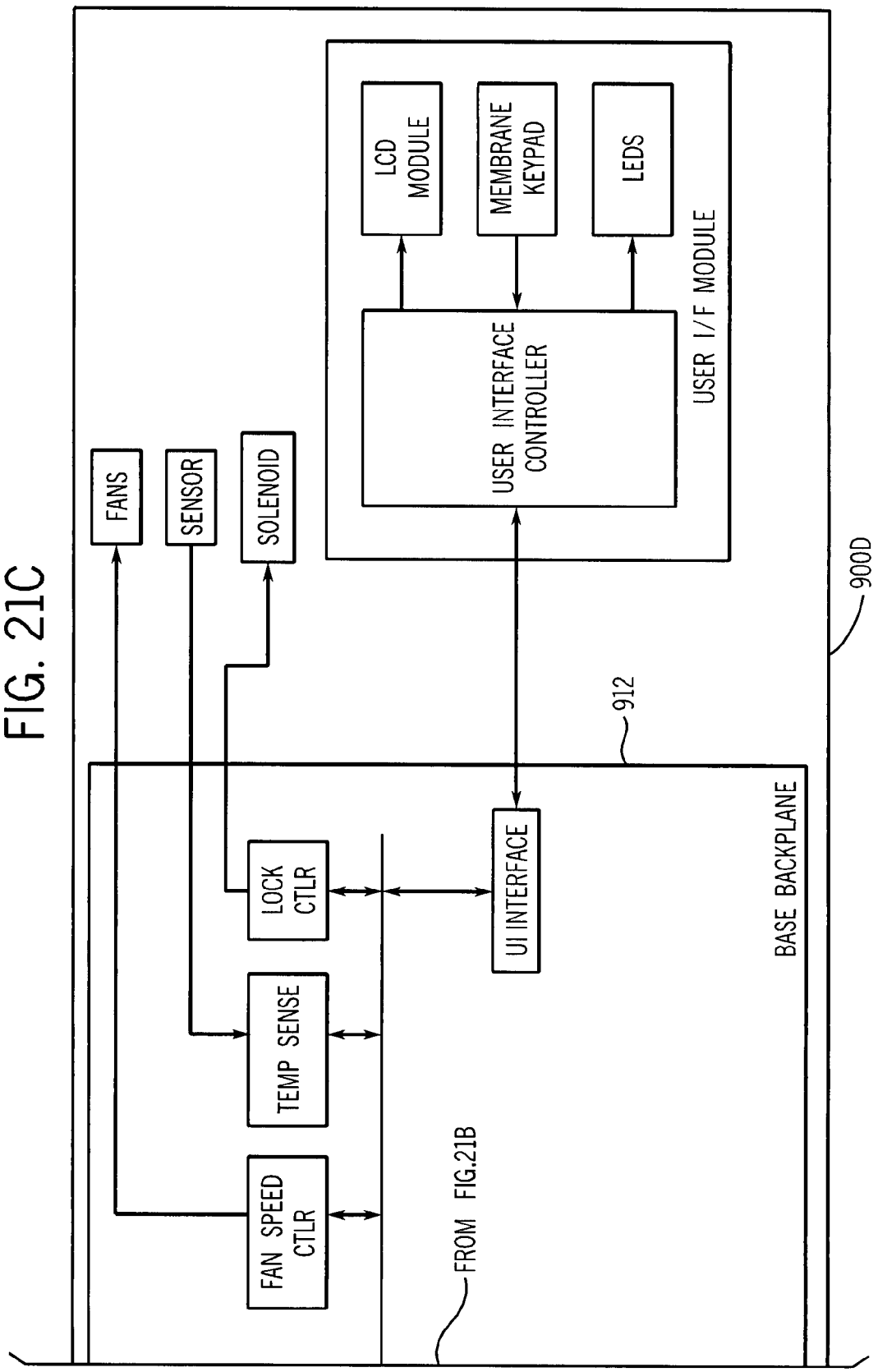

A network device base station 900D of FIGS. 21A-21C can provide Ethernet or other connection to a network instead of FireWire or USB interfacing, for example. The combination of brick 100 and base station 900D of FIGS. 21A-21C is again analogous to the systems shown in FIGS. 18A-20C, except that a network I/O module 978 couples brick 100 to a network such as a LAN 979.

As noted in the specific embodiments of FIGS. 18A-21C, a status/indicator screen and/or other interface 904 can provide relevant information to a base station user. Interface 904 can provide a user with information such as the identity of the module, user data, power requirements or issues (for example, inadequate base station power supply for running the RAID system in the brick), etc. Other uses for the screen/interface 904 will be apparent to those skilled in the art.

As shown in FIGS. 13-16, in top-loading base stations, a mounting, platform 906 provides support for a brick 100 to be mounted to the base station. Platform 906 is a stable mounting surface having anti-lifting apparatus for horizontally accepting and vertically immobilizing a brick, a locking mechanism for horizontally locking the brick into a usable position on or in a base station and a base station connector 940 for electrically coupling the backplane 112 of a brick 100 to the base station's electrical equipment (for example, a base station backplane). Other specific implementations of the anti-lifting, locking and electrical connection components disclosed herein will be apparent to those skilled in the art and are deemed equivalents to the specific embodiments shown in the Figures and disclosed herein.

The various base stations usable in embodiments of the present invention thus provide simple, standardized apparatus for storing, accessing, archiving, etc. data on a brick. The exemplary base stations described herein can be used in an office or lab setting, but also can be portable so that one or more base stations can be taken into the field with one or more bricks to permit collection, evaluation, etc. of data not available in an office or lab setting.

The backplane of a brick typically is a circuit board providing basic connections and functionalities for the brick and the disk drives. Other suitable apparatus to use instead of such circuit boards are deemed to be equivalents of the board of a backplane herein. Functional aspects of the backplane can be derived from the descriptions of various base station implementations in FIGS. 18A-21C, and are well known to those skilled in the art.

The self-describing capability of a brick according to the present invention can be implemented in various ways. In one embodiment a serial EEPROM is used as the non-volatile memory device used to collect, store, process and provide static and dynamic information about a RAID set via a brick's backplane and associated circuitry. The terms "non-volatile memory device" and "EEPROM" are used interchangeably in this disclosure and are intended to include the serial EEPROM of one embodiment of the present invention as well as all equivalent devices, structures, etc. The present invention's novel use of an EEPROM in connection with a RAID set or other system of disk drives permits low-cost, simple, reliable and compact management of the RAID set or other disk drive system as compared to earlier management systems and apparatus.

As noted above, the non-volatile memory device maintains static and dynamic information about the brick itself, the disk drives housed therein, and any operation of the brick and/or disk drives. Static system data or information (for example, information available at the time the brick is manufactured, brick functional characteristics and specifications, etc.) and the like can be recorded and/or provided to a user (for example, brick model number and type, power requirements and limits, disk drive capacity, data structure revisions, checksums, module serial number, manufacture date, a static descriptive name such as a model name, channels supported, channel map, channel removability map, power enable support for drives, fans and the like, temperature sense support, number of fans, read/write versus read-only support and descriptions, drive presence detection capability, etc.).

In addition, dynamic data or information can be collected, monitored, recorded and provided (for example, system information outside user control and user data that can be changed, updated, etc. by a user by choice). Dynamic system information can include information about and from the last power up of the brick and/or one or more disk drives, providing dynamic information about use. Dynamic system information can also include important error logging information to record errors in brick and/or disk drive operation, especially across power cycles, thus providing users with historical data/information about device performance. This type of information allows RAID set rebuilding of its array without the need for user involvement or intervention.

Dynamic user information can include data a user has chosen to associate with a brick and/or the disk drive set housed in the brick. For example, identifying information such as file numbers, asset numbers, case numbers and the like can be assigned and used by the user, especially in situations where the user wants to be able to query one or more bricks to be able to track and locate information/data as needed. Other types of dynamic user information that can be updated are well known to those skilled in the art.

Other dynamic information that can be collected, maintained and supplied by the non-volatile memory device include data structure revisions, checksums, last known drives (for example, maps of detected drives, ATA model of drives, ATA serial number of drives, drive failure counts, online drive status, offline drive status, dead drive status, date/time of last update, clean shutdown indicator, mount indicator, etc.). The serial EEPROM or other non-volatile memory device also can maintain other types of dynamic user data such as data structure revisions, checksums, user assigned names, user assigned unit numbers, user assigned descriptive names/strings, user assigned notes, etc. and an event log (for example, a FIFO of most recent logs of events such as new drive detections, drive removals, drive failures, administrative actions, etc.).

The combination of a disk drive set with a non-volatile memory device such as a serial EEPROM thus provides highly useful static and dynamic information to users. However, despite these advantages over the earlier hard disk drive enclosures, this combination nevertheless allows for the reductions in cost, weight, size and complexity offered by embodiments of the present invention.

As noted above, when in use with a top-loading base station, bricks are physically mounted and electrically coupled to the base station using a mounting apparatus (typically including an anti-lifting apparatus and a locking apparatus) and electrical coupling apparatus to permit reliable coupling of the brick to the base station. With front-loading base stations, the mounting apparatus usually includes just the locking apparatus (the anti-lifting apparatus is unnecessary because the brick is encased in a front-loading base station). Along with the mounting apparatus, an electrical coupling apparatus is used. The mounting apparatus and the electrical coupling apparatus combine to provide communication between a base station and a brick mounted thereon or therein, while preventing physical disturbance and electrical disruption of the brick/base station combination.

In the embodiment(s) of the present invention shown in the Figures, the anti-lifting apparatus comprises a number of sliders and undercuts or other slots working in cooperation with the electrical connectors between the brick and a base station. As seen in the exemplary embodiments in FIGS. 3, 4, 5, 8 and 13-16, each base station 900 has sliders 930 that protrude above base station support platform 906. In the embodiment shown in FIGS. 3 and 13-16, the sliders 930 have an inverted isosceles trapezoidal cross-section. Undercuts 130 in brick 100 have a cutout profile that matches and mates with sliders 930 so that a brick 100 cannot be moved vertically off of support platform 906 once undercuts 130 have engaged sliders 930.

Undercuts 130 and sliders 930 are dimensioned so that the electrical connector 140 of brick 100 and its matching electrical connector 940 on a base station 900 cannot mate unless and until the undercuts 130 and sliders 930 are engaged to prevent vertical and side-to-side movement of the brick 100. Other anti-lifting apparatus that provide equivalent operational benefits will be apparent to those skilled in the art and are deemed to fall within the definition of the term "anti-lifting apparatus" as used herein. The brick electrical connector 140 and base station electrical connector 940 can be fabricated in a customized manner so that only bricks designated for use with a given set of base stations can be electrically coupled to such base stations.

Finally, to further assist in immobilizing a brick when it is in electrical and operational engagement with base station, a locking mechanism also can be provided in each base station. In the top-loading base station 900 shown in FIGS. 13-16, the locking mechanism 950 is housed in support platform 906 and "reaches up" to engage and lock a retaining slot 150 brick 100. As seen in FIG. 17A, this same type of locking mechanism 955 can be used for front loading bricks, except that the retaining slot 155 is on the side of the brick 100. To accommodate both top and front loading base stations, each brick 100 typically will include both a bottom retaining slot 150 and a side located retaining slot 155. The locking mechanism can be mechanical (for example, operated by a key switch 952 or the like) or can be electrical (for example, a solenoid actuated when the base station detects electrical connection to a brick) or a combination of the two. Other locking mechanisms that provide equivalent operational benefits will be apparent to those skilled in the art and are deemed to fall within the definition of the term "locking mechanism" as used herein.

Figure 22:
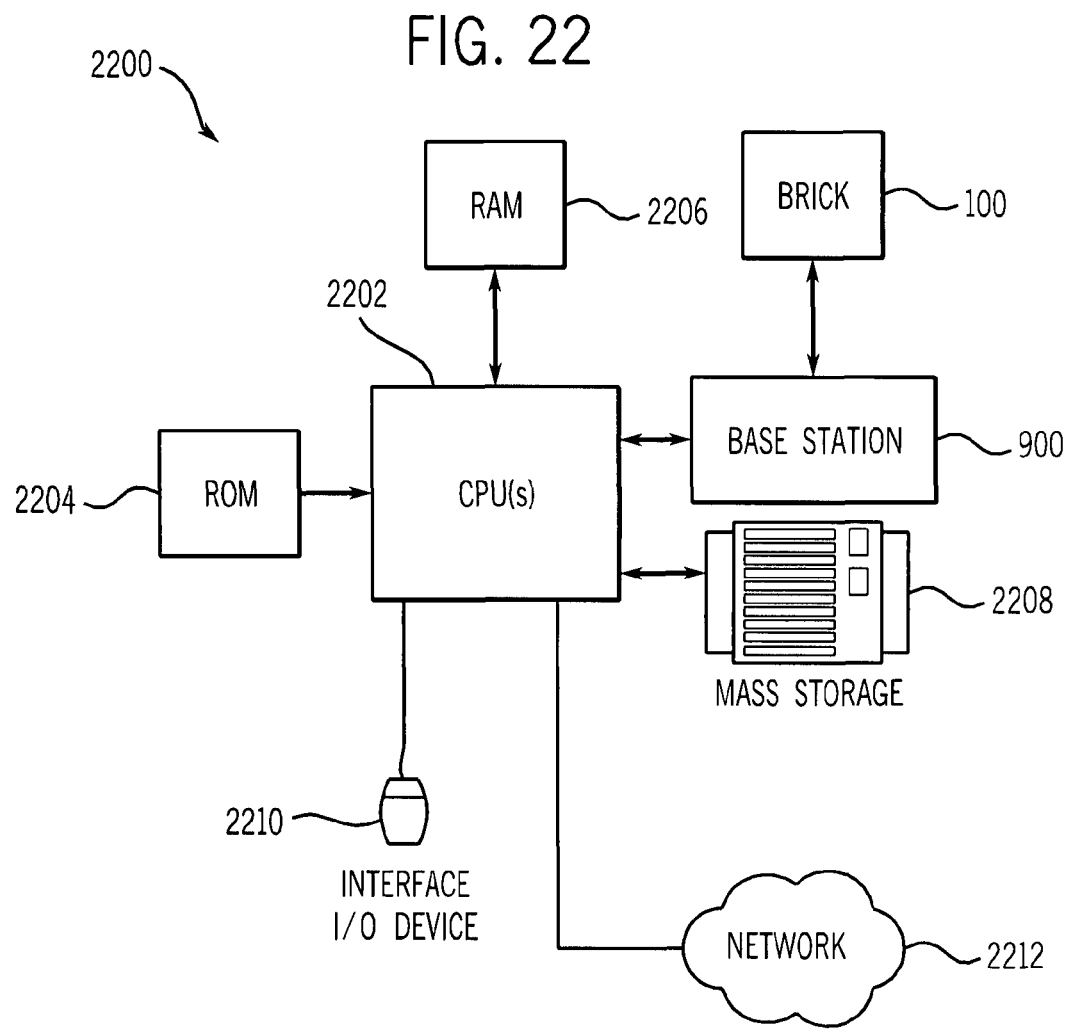
FIG. 22 is a block diagram of a typical computer system or integrated circuit system suitable for implementing embodiments of the present invention, including as part of a base station to which a brick can be mounted according to one or more embodiments of the present invention.

FIG. 22 illustrates a typical computer system that can be used as a host computer and/or other component in a system in accordance with one or more embodiments of the present invention. For example, the computer system 2200 of FIG. 22 can execute software and perform other functions, consistent with discussions herein in connection with embodiments of the present invention above. The computer system 2200 includes any number of processors 2202 (also referred to as central processing units, or CPUs) that are coupled to storage devices including primary storage 2206 (typically a random access memory, or RAM), primary storage 2204 (typically a read only memory, or ROM). As is well known in the art, primary storage 2204 acts to transfer data and instructions uni-directionally to the CPU and primary storage 2206 is used typically to transfer data and instructions in a bi-directional manner. Both of these primary storage devices may include any suitable of the computer-readable media. A mass storage device 2208 also is coupled bi-directionally to CPU 2202 and provides additional data storage capacity and may include any of the computer-readable media. The mass storage device 2208 may be used to store programs, data and the like and is typically a secondary storage medium such as a hard disk that is slower than primary storage. It will be appreciated that the information retained within the mass storage device 2208, may, in appropriate cases, be incorporated in standard fashion as part of primary storage 2206 as virtual memory. A specific mass storage device such as a CD-ROM may also pass data uni-directionally to the CPU. Where the system 2200 is coupled to or integrated in a base station according to the present invention, the mass storage device 2208 might also include one or more bricks, as described above.

Exemplary CPU 2202 also is coupled to an interface 2210 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Moreover, CPU 2202 optionally may be coupled to a computer or telecommunications network using a network connection as shown generally at 2212. With such a network connection, it is contemplated that the CPU might receive information from the network, or might output information to the network in the course of performing described method steps, for example where a network base station is in use. Finally, CPU 2202, when it is part of a host computer or the like, may be coupled to a base station 900 or other computational unit according to an embodiment of the present invention that is used to access one or more bricks 100 and/or other tasks. The above-described devices and materials will be familiar to those of skill in the computer hardware and software arts. The hardware elements described above may define multiple software modules for performing the operations of this invention. For example, instructions for running a data encryption cracking program, password breaking program, etc. may be stored on mass storage device 2208 and executed on CPU 2202 in conjunction with primary memory 2206.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A disk drive brick in a data management system comprising first and second base stations, wherein each of the first and second base station comprises a first electrical connector configured to electrically couple the base station to the brick, a disk drive array controller, and a power controller for controlling power to the brick, the disk drive brick comprising:
 a frame;
 a disk drive array held in the frame, the disk drive array comprising a plurality of disk drives; and
 a backplane coupled to the disk drive array, wherein the backplane comprises:
  a non-volatile memory device configured to store configuration data concerning the brick and information concerning each of the disk drives of the disk drive array; and
  a second electrical connector configured to electrically couple the brick to the first base station or the second base station,
 wherein the brick is configured to be removed from the first base station and physically mounted to the second base station,
 wherein, in response to mounting the brick to the second base station after being removed from the first base station, the disk drive array controller in the second base station is configured to query the brick to retrieve the configuration data stored in the non-volatile memory of the brick and automatically reconfigure the disk drive array controller based on the retrieved configuration data, and
 wherein the first electrical connector in the second base station is configured to provide power and disk drive array interface signals to the second electrical connector in the brick when the brick is physically mounted to the second base station.

2. The disk drive brick of claim 1 wherein the second electrical connector is configured to provide power from the first or second base station to the brick and drive interface signals from the first or second base station to the brick.

3. The disk drive of claim 2 wherein the second electrical connector is further configured to provide control and status signals by which the first or second base station may interrogate and control the brick, wherein the control and status signals are used to interrogate and update the non-volatile memory device.

4. The disk drive brick of claim 1 wherein the brick is self-describing by comprising at least one of the following:
 dynamic information about the brick;
 dynamic information about at least one disk drive of the disk drives in the disk drive array;
 static information about the brick; or static information about at least one disk drive of the disk drives in the disk drive array.

5. The disk drive brick of claim 1 further comprising a mounting apparatus configured to immobilize the brick when the brick is mounted to the first or second base station.

6. The disk drive brick of claim 5 wherein the brick is a top-loading brick and wherein the mounting apparatus further comprises an anti-lifting apparatus and a locking apparatus.

7. The disk drive brick of claim 1 wherein the disk drive array comprises a plurality of disk drives configured as a RAID set.

8. The disk drive brick of claim 1 wherein the non-volatile memory device comprises a serial EEPROM.

9. The disk drive brick of claim 1 further comprising fan apparatus for cooling the disk drive array.

10. A data management system comprising:
first and second base stations; and
a brick configured to be removed from the first base station and physically mounted to the second base station, wherein the brick comprises:
a frame;
a disk drive array held in the frame, the disk drive array comprising a plurality of disk drives; and
a backplane coupled to the disk drive array, wherein the backplane comprises:
a non-volatile memory device configured to store configuration data concerning the brick and information concerning each of the disk drives of the disk drive array; and
a first electrical connector configured to electrically couple the brick to the first base station or the second base station,
wherein each of the first and second base station comprises:
a second electrical connector configured to electrically couple the base station to the brick;
a disk drive array controller; and
a power controller for controlling power to the brick,
wherein, in response to mounting the brick to the second base station after being removed from the first base station, the disk drive array controller in the second base station is configured to query the brick to retrieve the configuration data stored in the non-volatile memory of the brick and automatically reconfigure the disk drive array controller based on the retrieved configuration data, and
wherein the second electrical connector in the second base station is configured to provide power and disk drive array interface signals to the first electrical connector in the brick when the brick is physically mounted to the second base station.

11. The data management system of claim 10 wherein the first and second base stations comprise at least one of:
a network base station;
an I/O base station;
an archiver base station; or
a duplicator base station.

12. The data management system of claim 10 wherein the disk drive array comprises a plurality of disk drives configured as a RAID set.

13. The data management system of claim 12 wherein the brick is self-describing by comprising at least one of the following:
dynamic information about the brick;
dynamic information about a disk drive of the disk drives in the disk drive array;
static information about the brick; or
static information about a disk drive of the disk drives in the disk drive array.

14. The data management system of claim 10 wherein the non-volatile memory device comprises a serial EEPROM.

15. The data management system of claim 10 wherein each of the first and second base stations further comprises:
disk drive array control logic;
front end logic comprising at least one of the following:
a host interface; or
a network interface.

16. A first base station configured to be used in a modular data management system comprising a modular storage system module, the first base station, and a second base station, wherein the modular storage system module comprises a disk drive array comprising a plurality of disk drives and a backplane coupled to the disk drive array, the backplane comprising a non-volatile memory device configured to store configuration data concerning the modular storage system module and information concerning each of the disk drives of the disk drive array, and a first electrical connector configured to electrically couple the modular storage system module to the first base station or the second base station, the first base station comprising:
a second electrical connector configured to supply power to the modular storage system module when the modular storage system module is electrically coupled to the first base station;
control logic configured to read the configuration data and the information concerning each of the disk drives of the disk drive array stored in the non-volatile memory device of the module storage system module to configure the control logic to provide power to and to control the disk drive array of the modular storage system module when the modular storage system module is mounted to the first base station; and
a front-end interface for interfacing with the modular storage system module.

17. The first base station of claim 16 further comprising a mounting apparatus for immobilizing the modular storage system module when the modular storage system module is electrically coupled to the base stations.

18. The first base station of claim 16 further comprising an application-specific apparatus configured to perform at least one of the following:
acquisition of data;
analysis of data;
network connection of the modular storage system module when the modular storage system module is mounted to the first base station; or
I/O access to the modular storage system module when the modular storage system module is mounted to the first base station; or data duplication.

19. The first base station of claim 16 wherein the modular storage system module is mounted to the first base station using one of the following:
front-loading; or
top-loading.

20. A method for managing data, the method comprising:
removing a brick from a first base station, the brick including a frame, disk drive array held in the frame, the disk drive array comprising a plurality of disk drives, and a backplane coupled to the disk drive array, wherein the backplane comprises a non-volatile memory device configured to store configuration data concerning the brick and information concerning each of the disk drives of the disk drive array, and a first electrical connector configured to electrically couple the brick to a base station;

physically mounting the brick from the first base station to a second base station, wherein each of the first and second base station includes a second electrical connector configured to electrically couple the base station to the brick, a disk drive array controller, and a power controller for controlling power to the brick;

in response to mounting the brick to the second base station, querying the brick by the second base station for retrieving configuration data stored in the non-volatile memory of the brick and automatically reconfiguring the disk drive array controller of the second base station based on the retrieved configuration data; and providing via the second electrical connector in the second base station, power and disk drive array interface signals to the first electrical connector in the brick when the brick is physically mounted to the second base station.

* * * * *